US012735569B2

(12) United States Patent
Ogawa et al.

(10) Patent No.: US 12,735,569 B2
(45) Date of Patent: Sep. 15, 2026

(54) RESIN COMPOSITION, MOLDED BODY, AND FILM

(71) Applicant: KANEKA CORPORATION, Osaka (JP)

(72) Inventors: Kohei Ogawa, Settsu (JP); Fumiyasu Ishiguro, Settsu (JP)

(73) Assignee: KANEKA CORPORATION, Osaka (JP)

( * ) Notice: Subject to any disclaimer, the term of this patent is extended or adjusted under 35 U.S.C. 154(b) by 264 days.

(21) Appl. No.: 18/764,978

(22) Filed: Jul. 5, 2024

(65) Prior Publication Data

US 2024/0392131 A1 Nov. 28, 2024

Related U.S. Application Data

(63) Continuation of application No. PCT/JP2022/048340, filed on Dec. 27, 2022.

(30) Foreign Application Priority Data

Jan. 5, 2022 (JP) ................................ 2022-000739
Jun. 9, 2022 (JP) ................................ 2022-093806

(51) Int. Cl.
*C08L 79/08* (2006.01)
*C08J 5/18* (2006.01)

(52) U.S. Cl.
CPC ................. *C08L 79/08* (2013.01); *C08J 5/18* (2013.01); *C08J 2333/12* (2013.01); *C08J 2379/08* (2013.01); *C08L 2203/16* (2013.01)

(58) Field of Classification Search
None
See application file for complete search history.

(56) References Cited

U.S. PATENT DOCUMENTS

2019/0390057 A1 12/2019 Miyamoto et al.
2020/0028138 A1 1/2020 Ideta et al.
2020/0102423 A1* 4/2020 Nakayama ......... C08G 73/1007
2021/0333440 A1 10/2021 Kim et al.

FOREIGN PATENT DOCUMENTS

JP 2014-070187 A 4/2014
JP 2018-119132 A 8/2018
JP 2020-002325 A 1/2020
JP 2020-125454 A 8/2020
JP 2021-172087 A 11/2021
WO 2013/048126 A1 4/2013
WO 2018/079474 A1 5/2018
WO 2020/138045 A1 7/2020

OTHER PUBLICATIONS

International Preliminary Report on Patentability issued in corresponding International Application No. PCT/JP2022/048340, mailed Jul. 18, 2024 (5 pages).

* cited by examiner

*Primary Examiner* — Sheeba Ahmed
(74) *Attorney, Agent, or Firm* — Osha Bergman Watanabe & Burton LLP

(57) ABSTRACT

A resin composition including a polyamideimide and an acryl-based resin is provided. The polyamideimide has a diamine-derived structure, a tetracarboxylic-dianhydride-derived structure and a dicarboxylic-acid-derived structure, and contains a structure derived from a fluoroalkyl-substituted benzidine as the diamine-derived structure. A ratio of the dicarboxylic-acid-derived structure relative to the total of the tetracarboxylic-dianhydride-derived structure and the dicarboxylic-acid-derived structure of the polyamideimide may be 5 to 80 mol %. The resin composition may be used for production of formed article such as film.

15 Claims, 1 Drawing Sheet

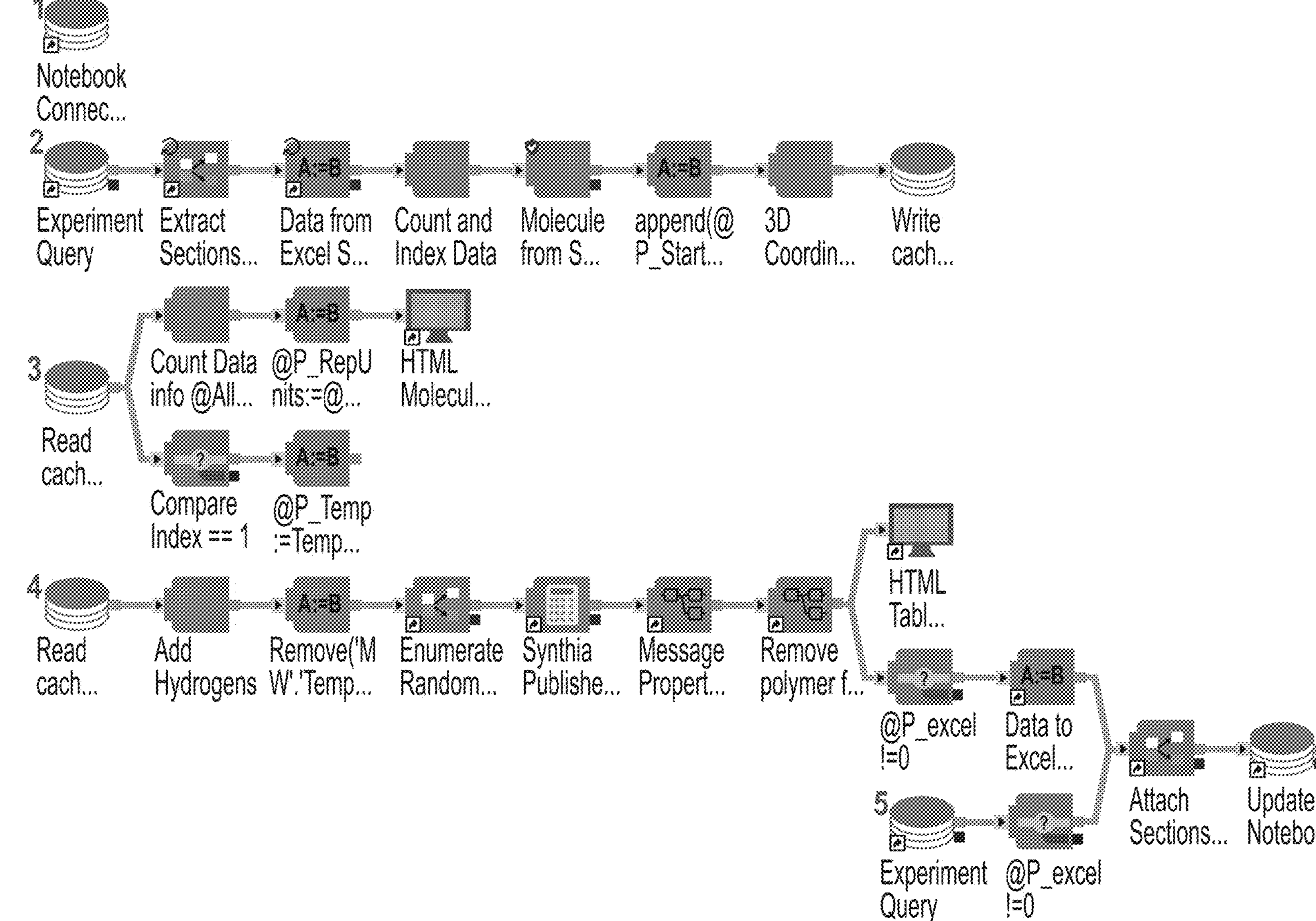

1
Notebook Connec...
2
Experiment Query
Extract Sections...
Data from Excel S...
Count and Index Data
Molecule from S...
append(@ P_Start...
3D Coordin...
Write cach...
3
Read cach...
Count Data info @All...
@P_RepU nits:=@...
HTML Molecul...
Compare Index == 1
@P_Temp :=Temp...
4
Read cach...
Add Hydrogens
Remove('M W'.'Temp...
Enumerate Random...
Synthia Publishe...
Message Propert...
Remove polymer f...
HTML Tabl...
@P_excel !=0
Data to Excel...
5
Experiment Query
@P_excel !=0
Attach Sections...
Update Notebook

RESIN COMPOSITION, MOLDED BODY, AND FILM

TECHNICAL FIELD

One or more embodiments of the present invention relate to a resin composition and formed article such as film.

BACKGROUND

Electronics devices such as display devices such as liquid crystal, organic EL and electronic papers, solar cells, and touch panels are required to be thin, lightweight, and flexible. Glass materials that are used for these devices are replaced by film materials to make the devices flexible, thin, and lightweight. As a replacement for glass, a transparent polyimide film has been developed and used for substrates for displays, cover films (cover windows) arranged on the outermost surface of display devices, and the like.

Transparent polyimide films have been developed as alternative materials to glass and used for display substrates, cover films, and the like. Patent Document 1, Patent Document 2, and Patent Document 3 disclose the use of a polyamideimide as a material for cover films of flexible displays.

PATENT DOCUMENTS

Patent Document 1: WO 2013/048126
Patent Document 2: JP 2018-119132 A
Patent Document 3: JP 2020-125454 A As described in Patent Documents 1 to 3, a polyamideimide having a specific composition has transparency and can have excellent mechanical strength and flexibility. A polyamideimide tends to improve in solubility in organic solvents and transparency as the ratio of an amide structure to the total of an imide structure and an amide structure increases. However, an increase in the proportion of an amide structure tends to reduce mechanical strength, and therefore a polyamideimide cannot easily achieve both transparency and high mechanical strength alone.

SUMMARY

One or more embodiments of the present invention provide a resin composition capable of achieving both excellent mechanical strength and transparency. One or more embodiments of the present invention relate to a resin composition containing a polyamideimide and an acryl-based resin. The resin composition may contain a polyamideimide and an acryl-based resin at a weight ratio of 98:2 to 2:98.

The polyamideimide has a diamine-derived structure represented by the general formula (IIIa), a tetracarboxylic-dianhydride-derived structure represented by the general formula (IVa), and a dicarboxylic-acid-derived structure represented by the general formula (Va), and includes, as the diamine-derived structure, a structure derived from a fluoroalkyl-substituted benzidine (IIIa)

(IVa)

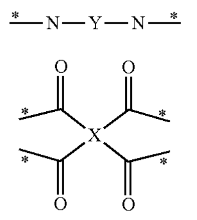

-continued (Va)

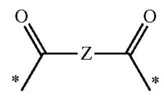

Y is a divalent organic group, and is a diamine residue. X is a tetravalent organic group, and is a tetracarboxylic dianhydride residue. Z is a divalent organic group, and is a dicarboxylic acid residue.

The polyamideimide may include, as the tetracarboxylic-dianhydride-derived structure, at least one structure derived from a tetracarboxylic dianhydride selected from the group consisting of a fluorine-containing aromatic tetracarboxylic dianhydride, an alicyclic tetracarboxylic dianhydride, a bis(trimellitic anhydride)ester, 4,4'-(4,4'-isopropylidenediphenoxy)diphthalic anhydride, and pyromellitic anhydride. The ratio of the total content of these structures derived from a tetracarboxylic dianhydride to the entire amount of the tetracarboxylic-dianhydride-derived structure may be 50 mol % or more.

The ratio of the dicarboxylic-acid-derived structure to the total of the tetracarboxylic-dianhydride-derived structure represented by the general formula (IVa) and the dicarboxylic-acid-derived structure represented by the general formula (Va) of the polyamideimide may be 5 to 80 mol %.

The acryl-based resin may have an imide structure or may have a glutarimide structure. The glutarimide structure content of the acryl-based resin may be 10 wt % or more. When having a high imide content, the acryl-based resin can have excellent compatibility also with the polyamideimide having a high proportion of the dicarboxylic-acid-derived structure (amide structure).

Since the polyamideimide and the acryl-based resin contained in the resin composition are compatible with each other, a transparent film having a small haze is obtained. In addition, since the polyamideimide resin and the acryl-based resin are compatible with each other, high transparency is achieved and coloring can be suppressed without significantly reducing the excellent mechanical strength of the polyamideimide, and a transparent film suitable for cover films of displays, etc. may be produced.

BRIEF DESCRIPTION OF THE DRAWINGS

The FIGURE is a diagram showing a protocol in BIOVIA Pipeline Pilot Polymer Properties.

DETAILED DESCRIPTION

[Resin Composition]

One or more embodiments of the present invention relate to a resin composition containing a polyamideimide and an acryl-based resin.

<Polyamideimide>

Polyamideimide is a polymer having an imide structural unit represented by the general formula (I) and an amide structural unit represented by the general formula (II).

(I)

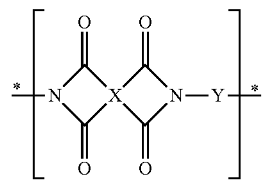

-continued (II)

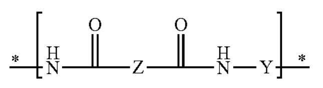

In the general formula (I) and the general formula (II), X is a tetravalent organic group and Y and Z are divalent organic groups. Y is a diamine residue, and is an organic group obtained by removing two amino groups from a diamine represented by the following general formula (III). X is a tetracarboxylic dianhydride residue, and is an organic group obtained by removing two carboxylic anhydride groups from a tetracarboxylic dianhydride represented by the following general formula (IV). Z is a dicarboxylic acid residue, and is an organic group obtained by removing two carboxyl groups from a dicarboxylic acid represented by the following general formula (V).

(III)

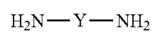

(IV)

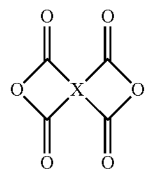

(V)

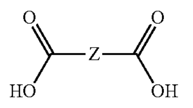

In other words, the polyamideimide includes a diamine-derived structure represented by the following general formula (IIIa), a tetracarboxylic-dianhydride-derived structure represented by the following general formula (IVa), and a dicarboxylic-acid-derived structure represented by the following general formula (Va). The diamine-derived structure (IIIa) and the tetracarboxylic-dianhydride-derived structure (IVa) are linked via imide bond to form the imide structural unit represented by the general formula (I), and the diamine-derived structure (IIIa) and the dicarboxylic-acid-derived structure (Va) are linked via amide bond to form the amide structural unit represented by the general formula (II).

(IIIa)

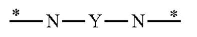

(IVa)

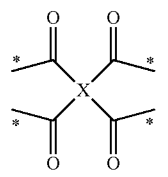

(Va)

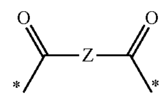

The polyamideimide may include two or more types of diamine residues Y, two or more types of tetracarboxylic dianhydride residues X, and two or more types of dicarboxylic acid residues Z.

It should be noted that as will be described later, the polyamideimide is generally obtained by synthesizing a polyamic acid using, as monomers, a diamine, a tetracarboxylic dianhydride, and a dicarboxylic acid derivative such as a dicarboxylic acid dichloride, and cyclodehydrating the polyamic acid at a site where the tetracarboxylic acid and the diamine are bonded to each other. Although a dicarboxylic acid derivative such as a dicarboxylic acid dichloride is used as a monomer as a starting material, the resulting polyamideimide has a structure Z (dicarboxylic acid residue), which is obtained by removing two carboxyl groups from a dicarboxylic acid. The polyamideimide may be synthesized using a diisocyanate instead of a diamine, but the resulting polyamideimide has a structure obtained by removing two isocyanate groups from the diisocyanate, and this structure is the same as the diamine-derived structure Y (diamine residue), which is obtained by removing two amino groups from a diamine. That is, in both a case where a diamine is used as a monomer and a case where a diisocyanate is used as a monomer, the resulting polyamideimide has a tetracarboxylic-dianhydride-derived structure X (tetracarboxylic dianhydride residue) obtained by removing four carboxyl groups from a tetracarboxylic dianhydride, a diamine residue Y, and a dicarboxylic acid residue Z. Therefore, irrespective of the types of starting materials (monomers) used for synthesizing the polyamideimide, a structure corresponding to the tetracarboxylic dianhydride residue X, a structure corresponding to the diamine residue Y, and a structure corresponding to the dicarboxylic acid residue Z contained in the polyamideimide are respectively expressed as a "tetracarboxylic dianhydride component", a "diamine component", and a "dicarboxylic acid component".

Hereinbelow, the diamine component, the tetracarboxylic dianhydride component, and the dicarboxylic acid component as monomer units constituting the polyamideimide will be described with reference to examples.

(Diamine)

The polyamideimide used in one or more embodiments of the present invention contains a fluoroalkyl-substituted benzidine as a diamine component. That is, the polyamideimide includes, as Y in the general formula (IIIa), a structural unit obtained by substituting at least one of hydrogen atoms at 2, 2', 3, 3', 5, 5', and 6, 6' positions of 4,4-biphenylene with a fluoroalkyl group. When containing a fluoroalkyl-substituted benzidine as a diamine component, the polyamideimide resin has improved solubility and transparency and tends to have improved compatibility with an acryl-based resin.

Examples of the fluoroalkyl-substituted benzidine include 2-(trifluoromethyl)benzidine, 3-(trifluoromethyl)benzidine, 2,3-bis(trifluoromethyl)benzidine, 2,5-bis(trifluoromethyl)benzidine, 2,6-bis(trifluoromethyl)benzidine, 2,3,5-tris(trifluoromethyl)benzidine, tetrakis(trifluoro)methyl)benzidine, 2,3,6-tris(trifluoromethyl)benzidine, 2,3,5,6-2,2'-bis(trifluoromethyl)benzidine, 3,3'-bis(trifluoromethyl)benzidine, 2,3'-bis(trifluoromethyl)benzidine, 2,2',3-tris(trifluoromethyl)benzidine, 2,3,3'-tris(trifluoromethyl)benzidine, 2,2',5-tris(trifluoromethyl)benzidine, 2,2',6-tris(trifluoromethyl))benzidine, 2,3',5-tris(trifluoromethyl)benzidine, 2,3',6,-tris(trifluoromethyl)benzidine, 2,2',3,3'-tetrakis(trifluoromethyl)benzidine, 2,2',5,5'-tetrakis(trifluoromethyl)benzidine, and 2,2',6,6'-tetrakis(trifluoromethyl)benzidine.

Among them, fluoroalkyl-substituted benzidines having a fluoroalkyl group at the 2-position of biphenyl are preferable, and 2,2'-bis(trifluoromethyl)benzidine (TFMB) is particularly preferable. When a fluoroalkyl group is present at each of 2- and 2'-positions of biphenyl, the x-electron density decreases due to the electron-attracting property of the fluoroalkyl group, and a bond between two benzene rings of biphenyl is twisted by steric hindrance of the fluoroalkyl group, leading to a decrease in planarity of the π-conjugate. Therefore, the absorption edge wavelength shifts to a short wave, so that coloring of the polyamideimide can be suppressed and solubility in an organic solvent is enhanced.

The polyamideimide may contain, as a diamine component, a diamine other than the fluoroalkyl-substituted benzidine. Among diamines other than the fluoroalkyl-substituted benzidine, diamines having an alicyclic structure, diamines having a fluorene structure, diamines having a sulfonyl group, and fluorine-containing diamines other than fluoroalkyl-substituted benzidines are preferred from the viewpoint of solubility of the polyamideimide and compatibility with an acryl-based resin.

(Alicyclic Diamine)

Examples of the diamine having an alicyclic structure include isophoronediamine, 1,2-cyclohexanediamine, 1,3-cyclohexanediamine, 1,4-cyclohexanediamine, 1,2-bis(aminomethyl)cyclohexane, 1,3-bis(aminomethyl)cyclohexane, 1,4-bis(aminomethyl)cyclohexane, bis(aminomethyl)norbornene, 4,4'-methylenebis(cyclohexylamine), bis(4-aminocyclohexyl)methane, 4,4'-methylenebis(2-methylcyclohexylamine), adamantane-1,3-diamine, 2,6-bis(aminomethyl) bicyclo[2.2.1]heptane, 2,5-bis(aminomethyl)bicyclo[2.2.1] heptane, and 1,1-bis(4-aminophenyl)cyclohexane.

Examples of the diamine having a fluorene skeleton include 9,9-bis(4-aminophenyl)fluorene.

Examples of the diamine having a sulfone group include 3,3'-diaminodiphenylsulfone, 3,4'-diaminodiphenylsulfone, 4,4'-diaminodiphenylsulfone, bis[4-(3-aminophenoxy)phenyl]sulfone, and bis[4-(4-aminophenoxy)phenyl]sulfone, 4,4'-bis[4-(4-amino-α,α-dimethylbenzyl)phenoxy]diphenylsulfone, and 4,4'-bis[4-(4-(aminophenoxy)phenoxy)diphenylsulfone. Among them, diaminodiphenylsulfones such as 3,3'-diaminodiphenylsulfone and 4,4'-diaminodiphenylsulfone are preferable.

Examples of fluorine-containing diamines other than fluoroalkyl-substituted benzidines include diamines having an aromatic ring to which a fluoroalkyl group is bonded, such as 1,4-diamino-2-(trifluoromethyl)benzene, 1,4-diamino-2,3-bis(trifluoromethyl)benzene, 1,4-diamino-2,5-bis(trifluoromethyl)benzene, 1,4-diamino-2,6-bis(trifluoromethyl) benzene, 1,4-diamino-2,3,5-tris(trifluoromethyl)benzene, 1,4-diamino-2,3,5,6-tetrakis(trifluoromethyl)benzene;

diamines having a fluoroalkyl group not directly bonded to an aromatic ring, such as 2,2-bis(4-aminophenyl) hexafluoropropane, 2,2-bis(3-aminophenyl) hexafluoropropane, and 2,2-bis[4-(4-aminophenoxy)phenyl]hexafluoropropane;

diamines having an aromatic ring to which a fluorine atom is bonded, such as 2-fluorobenzidine, 3-fluorobenzidine, 2,3-difluorobenzidine, 2,5-difluorobenzidine, 2,6-difluorobenzidine, 2,3,5-trifluorobenzidine, 2,3,6-trifluorobenzidine, 2,3,5,6-tetrafluorobenzidine, 2,2'-difluorobenzidine, 3,3'-difluorobenzidine, 2,3'-difluorobenzidine, 2,2'3-trifluorobenzidine, 2,3,3'-trifluorobenzidine, 2,2'5-trifluorobenzidine, 2,2'6-trifluorobenzidine, 2,3'5-trifluorobenzidine, 2,3'6-trifluorobenzidine, 2,2'3,3'-tetrafluorobenzidine, 2,2'5,5'-tetrafluorobenzidine, 2,2'6,6'-tetrafluorobenzidine, 2,2'3,3'6,6'-hexafluorobenzidine, 2,2'3,3'5,5'6,6'-octafluorobenzidine, 1,4-diamino-2-fluorobenzene, 1,4-diamino-2,3-difluorobenzene, 1,4-diamino-2,5-difluorobenzene, 1,4-diamino-2,6-difluorobenzene, 1,4-diamino-2,3,5-trifluorobenzene, 1,4-diamino-2,3,5,6-tetrafluorobenzene, and 2,2'-dimethylbenzidine.

Polyamideimide may contain aromatic diamines other than the above described and chain diamines as the diamine component.

As the diamine, one having an amide bond may also be used. For example, an amide produced by bonding a diamine to carboxy groups at both ends of a dicarboxylic acid is represented by general formula (VI).

(VI)

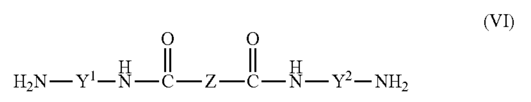

In the general formula (VI), $Y^1$ and $Y^2$ are diamine residues, and Z is a dicarboxylic acid residue. The amide structure-containing diamine represented by the general formula (VI) is composed of one dicarboxylic acid (derivative) and two diamines, and therefore in calculation of the composition of the polyamideimide, the amide structure-containing diamine is regarded as having one dicarboxylic acid residue and two diamine residues.

The general formula (VI) shows a structure obtained by condensation of one dicarboxylic acid with two diamines, but two dicarboxylic acids and three diamines may be condensed, or three or more dicarboxylic acids and four or more diamines may be condensed. In synthesizing the polyamideimide, a polyimide having the structure represented by the general formula (II) (i.e., a polyamideimide) may be synthesized using an amine-terminated amide oligomer, as a monomer, instead of the dicarboxylic acid derivative. The dicarboxylic acid derivative and the amine-terminated amide oligomer may be used in combination.

Specific examples of the diamine containing a condensed structure of a fluoroalkyl-substituted benzidine and a dicarboxylic acid include a condensate of TFMB and a dicarboxylic acid. The dicarboxylic acid is particularly preferably terephthalic acid and/or isophthalic acid. For example, a diamine in which TFMB is condensed at both ends of terephthalic acid has a structure of the following formula (4).

(4)

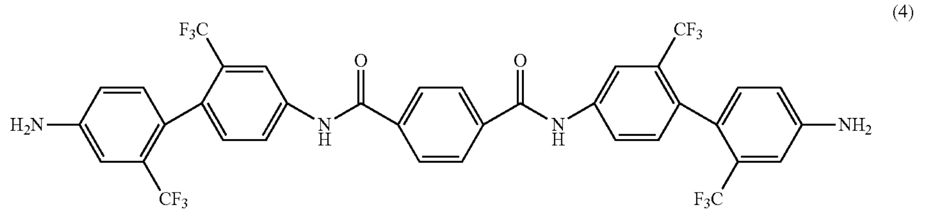 [SMILES: Nc1ccc(-c2ccc(NC(=O)c3ccc(C(=O)Nc4ccc(-c5ccc(N)cc5C(F)(F)F)c(C(F)(F)F)c4)cc3)cc2C(F)(F)F)c(C(F)(F)F)c1]

(Tetracarboxylic Dianhydride)

The tetracarboxylic dianhydride component of the polyamideimide is not limited. From the viewpoint of solubility of the polyamideimide and compatibility with an acryl-based resin, the polyamideimide preferably contains, as a tetracarboxylic dianhydride component, at least one selected from the group consisting of a fluorine-containing aromatic tetracarboxylic dianhydride, an alicyclic tetracarboxylic dianhydride, and a fluorine-free aromatic tetracarboxylic dianhydride such as a bis(trimellitic anhydride)ester or 4,4'-(4,4'-isopropylidenediphenoxy)diphthalic anhydride.

Examples of the fluorine-containing aromatic tetracarboxylic dianhydride include 4,4'-(hexafluoroisopropylidene) diphthalic anhydride, 2,2-bis[4-(3,4-dicarboxyphenoxy) phenyl]hexafluoropropane dianhydride, 1,4-difluoropyromellitic dianhydride, 1,4-bis(trifluoromethyl) pyromellitic dianhydride, 4-trifluoromethylpyromellitic dianhydride, 3,6-di[3',5'-bis(trifluoromethyl)phenyl]pyromellitic dianhydride, and 1-(3',5'-bis(trifluoromethyl)phenyl) pyromellitic dianhydride. Among them, 4,4'-(hexafluoroisopropylidene)diphthalic anhydride (6FDA) is particularly preferable from the viewpoint of achieving both transparency and mechanical strength of the polyamideimide.

The alicyclic tetracarboxylic dianhydride is only required to have at least one alicyclic structure, and may have both an alicyclic ring and an aromatic ring in one molecule. The alicyclic ring may be polycyclic, or may have a spiro structure.

Examples of the alicyclic tetracarboxylic dianhydride include 1,2,3,4-cyclobutanetetracarboxylic dianhydride, 1,2,3,4-cyclopentanetetracarboxylic dianhydride, 1,3-dimethylcyclobutane-1,2,3,4-tetracarboxylic dianhydride, 1,2,3,4-tetramethyl-1,2,3,4-cyclobutanetetracarboxylic dianhydride, 1,2,4,5-cyclohexanetetracarboxylic dianhydride, 1,1'-bicyclohexane-3,3',4,4'-tetracarboxylic-3,4:3',4'-dianhydride, norbornane-2-spiro-α-cyclopentanone-α'-spiro-2"-norbornane-5,5",6,6"-tetracarboxylic dianhydride, 2,2'-binorbornane-5,5',6,6' tetracarboxylic dianhydride, 3-(carboxymethyl)-1,2,4-cyclopentanetricarboxylic 1,4:2,3-dianhydride, bicyclo[2.2.2]octa-7-ene-2,3,5,6-tetracarboxylic dianhydride, 4-(2,5-dioxotetrahydrofuran-3-yl)-1,2,3,4-tetrahydronaphthalene-1,2-dicarboxylic cyclohexane-1,4-diylbis (methylene)bis(1,3-dioxo-1,3-dihydroisobenzofuran-5-anhydride, carboxylate), 5-(2,5-dioxotetrahydrofuryl)-3-methyl-3-cyclohexene-1,2-dicarboxylic anhydride, 5,5'-[cyclohexylidenebis(4,1-phenyleneoxy)]bis-1,3-isobenzofurandione, 5-isobenzofurancarboxylic acid, 1,3-dihydro-1,3-dioxo-,5,5'-[1,4-cyclohexanediylbis (methylene)]ester, bicyclo[2.2.1]heptane-2,3,5,6-tetracarboxylic dianhydride, bicyclo[2.2.2]octane-2,3,5,6-tetracarboxylic dianhydride, 3,5,6-tricarboxynorbornane-2-acetic 2,3:5,6-dianhydride, decahydro-1,4,5,8-dimethanonaphthalene-2,3,6,7-tetracarboxylic dianhydride, tricyclo[6.4.0.0 (2,7)]dodecane-1,8:2,7-tetracarboxylic dianhydride, octahydro-1H,3H,8H, 10H-biphenyleno[4a, 4b-c: 8a,8b-c']difuran-1,3,8,10-tetrone, ethylene glycolbis (hydrogenated trimellitic anhydride)ester, and decahydro[2] benzopyrano[6,5,4,-def][2]benzopyrano-1,3,6,8-tetrone.

Among the alicyclic tetracarboxylic dianhydrides, from the viewpoint of the transparency of the polyiamidemide and compatibility with an acryl-based resin. 1,2,3,4-cyclobutanetetracarboxylic dianhydride (CBDA), 1,2,3,4-cyclopentanetetracarboxylic dianhydride (CPDA), 1,2,4,5-cyclohexanetetracarboxylic dianhydride (H-PMDA), or 1,1'-bicyclohexane-3,3',4,4'-tetracarboxylic-3,4:3',4'-dianhydride (H-BPDA) is preferable from the viewpoint of the transparency and mechanical strength of the polyamideimide, and 1,2,3,4-cyclobutanetetracarboxylic dianhydride is particularly preferable.

The bis(trimellitic anhydride)ester is represented by the following general formula (1).

(1)

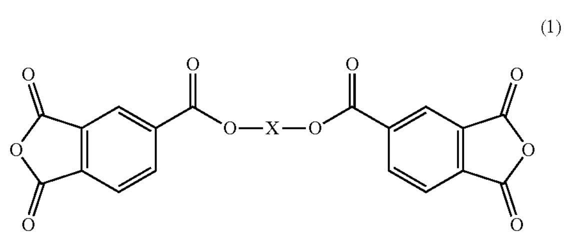

X in general formula (1) is an arbitrary divalent organic group, and a carboxy group and a carbon atom of X are bonded to each other at both ends of X. The carbon atom bonded to the carboxy group may form a ring structure. Specific examples of the divalent organic group X include the following (A) to (K).

(A)

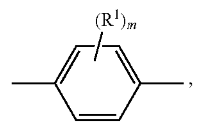

(B)

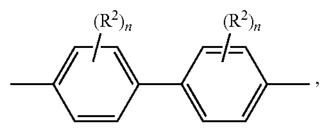

(C)

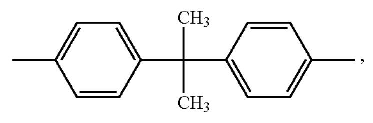

(D)

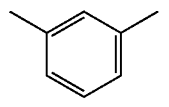

(E)

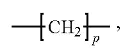

(F)

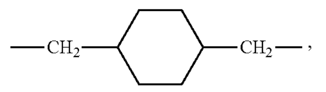

(G)

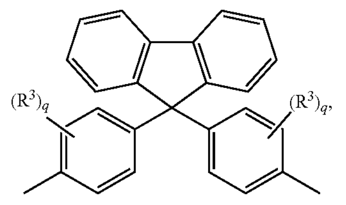

(H)

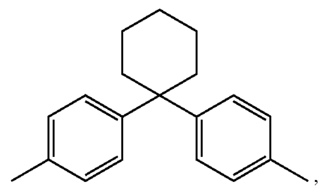

-continued (I)

(J)

(K)

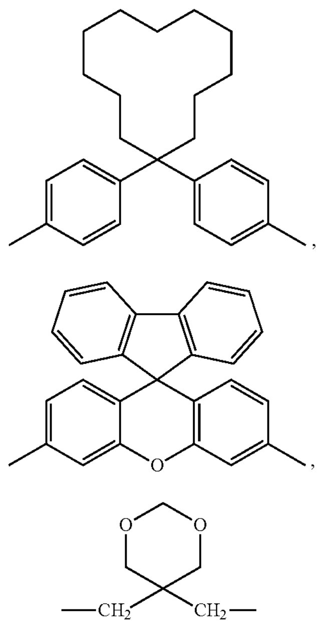

$R^1$ in formula (A) is an alkyl group having 1 to 20 carbon atoms, and m is an integer of 0 to 4. The group of formula (A) is a group obtained by removing two hydroxy groups from a hydroquinone derivative optionally having a substituent on a benzene ring. Examples of the hydroquinone having a substituent on a benzene ring include tert-butylhydroquinone, 2,5-di-tert-butylhydroquinone and 2,5-di-tert-amylhydroquinone. In the general formula (1), when X is (A) and m is 0 (that is, there is no substituent on the benzene ring), bis(trimellitic anhydride)ester is p-phenylenebis(trimellitate anhydride) (abbreviation: TAHQ).

Examples of the linear diol having 1 to 10 carbon atoms include ethylene glycol, and 1,4-butanediol.

The group of formula (F) is a group obtained by removing two hydroxy groups from 1,4-cyclohexanedimethanol.

In formula (G), $R^3$ is an alkyl group having 1 to 20 carbon atoms, and q is an integer of 0 to 4. The group of formula (G) is a group obtained by removing two hydroxy groups from biphenol fluorene optionally having a substituent on a benzene ring having a phenolic hydroxy group. Examples of the bisphenol fluorene derivative having a substituent on a benzene ring having a phenolic hydroxy group include biscresol fluorene.

The bis(trimellitic anhydride)ester is preferably an aromatic ester. Among the above groups (A) to (K), groups (A), (B), (C), (D), (G), (H) and (I) are preferable as X. Among them, the groups (A) to (D) are preferable, and the group (B) having a biphenyl backbone is particularly preferable. When X is a group of general formula (B), X is preferably 2,2',3,3',5,5'-hexamethylbiphenyl-4,4'-diyl of the following formula (B1) from the viewpoint of the solubility of the polyamideimide in an organic solvent and compatibility with an acryl-based resin.

(B1)

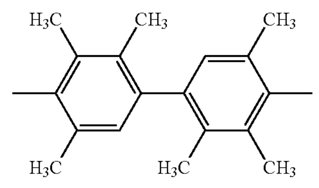

The acid dianhydride in which X is a group of formula (B1) in general formula (1) is bis(1,3-dioxo-1,3-dihydroisobenzofuran-5-carboxylic acid)-2,2',3,3',5,5'-hexamethylbiphenyl-4,4' diyl (abbreviation: TAHMBP) of the following formula (3).

(3)

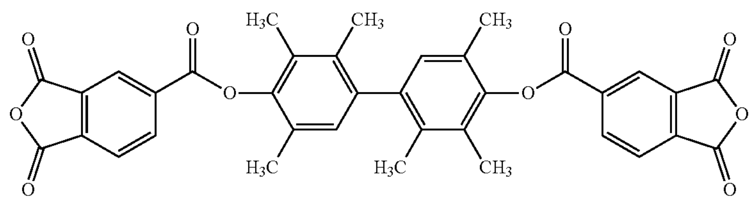

In formula (B), $R^2$ is an alkyl group having 1 to 20 carbon atoms, and n is an integer of 0 to 4. The group of formula (B) is a group obtained by removing two hydroxy groups from biphenol optionally having a substituent on a benzene ring. Examples of the biphenol derivative having a substituent on a benzene ring include 2,2'-dimethylbiphenyl-4,4'-diol, 3,3'-dimethylbiphenyl-4,4'-diol, 3,3',5,5'-tetramethylbiphenyl-4,4'-diol and 2,2',3,3',5,5'-hexamethylbiphenyl-4,4'-diol.

The group of formula (C) is a group obtained by removing two hydroxy groups from 4,4'-isopropylidenediphenol (bisphenol A). The group of formula (D) is a group obtained by removing two hydroxy groups from resorcinol.

In formula (E), p is an integer of 1 to 10. The group of formula (E) is a group obtained by removing two hydroxy groups from a linear diol having 1 to 10 carbon atoms.

Examples of the fluorine-free aromatic tetracarboxylic dianhydride other than the above-described bis(trimellitic anhydride)ester include tetracarboxylic acid dianhydrides in which two acid anhydride groups are bonded to one benzene ring, such as pyromellitic dianhydride (PMDA) and mellophanic dianhydride (MPDA); tetracarboxylic acid dianhydrides in which two acid anhydride groups are bonded to one condensed polycyclic ring, such as 2,3,6,7-naphthalenetetracarboxylic 2,3:6,7-dianhydride, naphthalene-1,4,5,8-tetracarboxylic dianhydride, and terphenyltetracarboxylic dianhydride; and tetracarboxylic acid dianhydrides in which an acid anhydride group is bonded to different aromatic rings, such as bis(trimellitic anhydride)ester, 3,3',4,4'-biphenyltetracarboxylic dianhydride (BPDA), 3,3',4,4'-benzophenonetetracarboxylic dianhydride (BTDA), 4,4'-oxydiphthalic anhydride (ODPA), 3,4'-oxydiphthalic anhydride (α-ODPA), 3,3',4,4'-diphenylsulfonetetracarboxylic dianhydride, 4,4'-(4,4'-isopropylidenediphenoxy)diphthalic anhydride (BPADA), 5,5'-dimethylmethylenebis(phthalic anhydride), 9,9-bis(3,4-dicarboxyphenyl)fluorene dianhydride (BPAF), 11,11-dimethyl-1H-difuro[3,4-b:3',4'-i]xanthene-1,3,7,9(11H)-tetrone, 1,4-bis(3,4-dicarboxyphenoxy)benzene dianhydride, 4-(2,5-dioxotetrahydrofuran-3-yl)-1,2,3,4-tetrahydronaphthalene-1,2-dicarboxylic dianhydride, ethylene glycol bis(trimellitic anhydride), N,N'-(9H-fluoren-9-ylidenedi-4,1-phenylene)bis[1,3-dihydro-1,3-dioxo-5-isobenzofurancarboxamide], N,N'-[[2,2,2-trifluoro-1-(trifluoromethyl)ethylidene]bis(6-hydroxy-3,1-phenylene)]bis[1,3-dihydro-1,3-dioxo-5-isobenzofurancarboxamide], and 2,2-bis(4-hydroxyphenyl)propane dibenzoate-3,3',4,4'-tetracarboxylic dianhydride.

Among them, from the viewpoint of the transparency and solubility of the polyamideimide and compatibility with an acryl-based resin, pyromellitic dianhydride (PMDA), mellophanic dianhydride (MPDA), 3,3'4,4'-biphenyltetracarboxylic dianhydride (BPDA), 4,4'-oxydiphthalic anhydride (ODPA), 3,3'4,4'-benzophenonetetracarboxylic dianhydride (BTDA), 4'-(4,4'-isopropylidenediphenoxy)diphthalic anhydride (BPADA) and 9,9-bis(3,4-dicarboxyphenyl)fluorene dianhydride (BPAF) are preferable. Among these, PMDA and BPADA are preferable and BPADA is particularly preferable.

(Dicarboxylic Acid)

Examples of the dicarboxylic acid include: aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 2,6-naphthalenedicarboxylic acid, 4,4'-oxybisbenzoic acid, 4,4'-biphenyldicarboxylic acid, and 2-fluoroterephthalic acid; alicyclic dicarboxylic acids such as 1,4-cyclohexanedicarboxylic acid, 1,3-cyclohexanedicarboxylic acid, 1,2-hexahydroterephthalic acid, hexahydroisophthalic acid, 1,3-cyclopentanedicarboxylic acid, and bi(cyclohexyl)-4,4'-dicarboxylic acid; and heterocyclic dicarboxylic acids such as 2,5-thiophene dicarboxylic acid and 2,5-furandicarboxylic acid.

From the viewpoint of solubility of the polyamideimide and compatibility with an acryl-based resin, the dicarboxylic acid is preferably an aromatic dicarboxylic acid or an alicyclic dicarboxylic acid, particularly preferably an aromatic dicarboxylic acid. Among aromatic dicarboxylic acids, terephthalic acid, isophthalic acid, 4,4'-biphenyl dicarboxylic acid, and 4,4'-oxybisbenzoic acid are preferable, and among these, terephthalic acid and isophthalic acid are preferable, and terephthalic acid is particularly preferable. Among alicyclic dicarboxylic acids, 1,4-cyclohexanedicarboxylic acid and bi(cyclohexyl)-4,4'-dicarboxylic acid are preferable, and 1,4-cyclohexanedicarboxylic acid is particularly preferable.

In the preparation of the compound containing a condensed structure of a diamine and a dicarboxylic acid, a dicarboxylic acid derivative such as dicarboxylic acid dichloride or dicarboxylic anhydride may be used instead of the dicarboxylic acid.

(Composition of Polyamideimide)

In the polyamideimide, the total of the tetracarboxylic-dianhydride-derived structure represented by the general formula (IVa) and the dicarboxylic-acid-derived structure represented by the general formula (Va) is preferably 90 to 110 parts by mol per 100 parts by mol of the diamine-derived structure represented by the general formula (IIIa). The total of the structure of the general formula (IVa) and the structure of the general formula (Va) may be 93 to 107 parts by mol, 95 to 105 parts by mol, 97 to 103 parts by mol, or 99 to 101 parts by mol per 100 parts by mol of the structure of the general formula (IIIa).

The ratio of the structure of the general formula (Va) to the total of the structure of the general formula (IVa) and the structure of the general formula (Va) is 1 to 99 mol %. The ratio between the structure of the general formula (IVa) and the structure of the general formula (Va) is almost the same as the ratio between the imide structure of the general formula (I) and the amide structure of the general formula (II). The ratio of the structure of the general formula (Va) to the total of the structure of the general formula (IVa) and the structure of the general formula (Va) may be 5 mol % or more, 10 mol % or more, 20 mol % or more, 30 mol % or more, 40 mol % or more, or 50 mol % or more and may be 80 mol % or less, 75 mol % or less, 70 mol % or less, 65 mol % or less, or 60 mol % or less.

As the proportion of the dicarboxylic-acid-derived structure of the general formula (Va) increases, i.e., as the proportion of the amide structure increases. solubility of the polyamideimide in organic solvents tends to improve. When the proportion of the dicarboxylic-acid-derived structure (the proportion of the amide structure) in the polyamideimide is high, the polyamideimide may be poor in compatibility with an acryl-based resin. As will be described later, when having an imide structure, the acryl-based resin exhibits excellent compatibility even with such a polyamideimide having a high proportion of the dicarboxylic-acid-derived structure.

As described above, the polyamideimide used in one or more embodiments of the present invention contains a fluoroalkyl-substituted benzidine as a diamine component. In the polyamideimide, the ratio of the amount of a dicarboxylic acid to the amount of a fluoroalkyl-substituted benzidine, i.e., the ratio of the structural unit of the general formula (Va) to the structural unit of the general formula (IIIa) in which Y is a structure obtained by substituting at least one of hydrogen atoms on the benzene rings of 4,4'-biphenylene with a fluoroalkyl group, may be 5 mol % or more, 10 mol % or more, 20 mol % or more, 30 mol % or more, 40 mol % or more, or 50 mol % or more and may be 80 mol % or less, 75 mol % or less, 70 mol % or less, 65 mol % or less, or 60 mol % or less.

The ratio of the amount of a fluoroalkyl-substituted benzidine to the total amount of diamine components in the polyamideimide is preferably 30 mol % or more. In other words, 30% or more of the diamine residues Y contained in the polyamideimide are preferably structural units obtained by substituting at least one of hydrogen atoms on the benzene rings of 4,4'-biphenylene with a fluoroalkyl group. The ratio of the amount of a diamine having a fluoroalkyl group to the total amount of diamine components in the polyamideimide is more preferably 50 mol % or more, still more preferably 70 mol % or more, and may be 80 mol % or more, 85 mol % or more, or 90 mol % or more. Particularly preferably, the ratio of the amount of TFMB to the total amount of diamine components is within the above range.

The polyamideimide preferably contains, as a tetracarboxylic dianhydride component, at least one selected from the group consisting of a fluorine-containing aromatic tetracarboxylic dianhydride, an alicyclic tetracarboxylic dianhydride, a bis(trimellitic anhydride)ester, 4,4'-(4,4'-isopropylidenediphenoxy)diphthalic anhydride, and pyromellitic anhydride. The ratio of the total amount of a fluorine-containing aromatic tetracarboxylic dianhydride, an alicyclic tetracarboxylic dianhydride, a bis(trimellitic anhydride) ester, 4,4'-(4,4'-isopropylidenediphenoxy)diphthalic anhydride, and pyromellitic anhydride to the total amount of tetracarboxylic dianhydride components in the polyamideimide is preferably 50 mol % or more, more preferably 60 mol % or more, still more preferably 70 mol % or more, and may be 75 mol % or more, 80 mol % or more, 85 mol % or more, 90 mol % or more, or 95 mol % or more.

As described above, the fluorine-containing aromatic tetracarboxylic dianhydride is particularly preferably 4,4'-(hexafluoroisopropylidene)diphthalic anhydride (6FDA). The alicyclic tetracarboxylic dianhydride is particularly preferably 1,2,3,4-cyclobutanetetracarboxylic dianhydride (CBDA). Particularly preferred examples of the bis(trimetillic anhydride)ester include p-phenylene bis(trimellitate (TAHQ) anhydride) and bis(1,3-dioxo-1,3-dihydroisobenzofuran-5-carboxylic acid)-2,2',3,3',5,5'-hexamethylbiphenyl-4,4'-diyl (TAHMBP). The fluorine-free aromatic tetracarboxylic dianhydride other than the bis(trimellitic anhydride)ester is particularly preferably 4,4'-(4,4'-isopropylidenediphenoxy)diphthalic dianhydride (BPADA).

The polyamideimide preferably contains, as a tetracarboxylic dianhydride component, at least one selected from the group consisting of 6FDA, CBDA, TAHQ, TAHMBP, BPADA, and PMDA. The ratio of the total amount of 6FDA, CBDA, TAHQ, TAHMBP, BPADA, and PMDA to the total amount of tetracarboxylic dianhydride components in the polyamideimide is preferably 50 mol % or more, more preferably 60 mol % or more, still more preferably 70 mol % or more, and may be 75 mol % or more, 80 mol % or more, 85 mol % or more, 90 mol % or more, or 95 mol % or more.

As described above, the dicarboxylic acid component of the polyamideimide is preferably terephthalic acid, isophthalic acid, 4,4'-biphenyldicarboxylic acid, 4,4'-oxybisbenzoic acid, 1,4-cyclohexanedicarboxylic acid, or bi(cyclohexyl)-4,4'-dicarboxylic acid. Among these, terephthalic acid and isophthalic acid are preferable, and terephthalic acid is particularly preferable.

The polyamideimide preferably contains, as a dicarboxylic acid component, at least one of these dicarboxylic acids. The ratio of the total amount of terephthalic acid, isophthalic acid, 4,4'-biphenyldicarboxylic acid, 4,4'-oxybisbenzoic acid, 1,4-cyclohexanedicarboxylic acid, and bi(cyclohexyl)-4,4'-dicarboxylic acid to the total amount of dicarboxylic acid components in the polyamideimide is preferably 50 mol % or more, more preferably 60 mol % or more, still more preferably 70 mol % or more, and may be 75 mol % or more, 80 mol % or more, 85 mol % or more, 90 mol % or more, or 95 mol % or more. The ratio of the total amount of terephthalic acid and isophthalic acid to the total amount of dicarboxylic acid components in the polyamideimide may be 50 mol % or more, 60 mol % or more, 70 mol % or more, 75 mol % or more, 80 mol % or more, 85 mol % or more, 90 mol % or more, or 95 mol % or more, and the amount of terephthalic acid may be within the above range.

(Preparation of Polyamideimide)

A method for preparing the polyamideimide is not limited. The polyamideimide is generally obtained by preparing, as a precursor, a polyamic acid by the reaction between a diamine and a tetracarboxylic dianhydride and a dicarboxylic acid or a derivative thereof and cyclodehydrating (imidizing) the polyamic acid.

A method for preparing the polyamic acid is not limited, and any publicly-known method can be used. For example, a polyamic acid solution is obtained by dissolving a diamine, a tetracarboxylic dianhydride, and a dicarboxylic acid or a derivative thereof in an organic solvent and stirring the solution. In this case, the amount of each of the monomers should be adjusted so that the total amount of the tetracarboxylic dianhydride and the dicarboxylic acid or the derivative thereof is almost equimolar to the amount of the diamine (e.g., the molar ratio is 90:100 to 110:100). Examples of the dicarboxylic acid derivative include a dicarboxylic acid dichloride, a dicarboxylic acid ester, and a dicarboxylic anhydride.

The polyamic acid may be prepared by a polymerization method in which some of the monomers are previously polymerized to prepare an oligomer, and the residual monomer is added to the oligomer. An example of the oligomer is the above-described amine-terminated oligomer.

The concentration of the polyamic acid solution is typically 5 to 35 wt %, preferably 10 to 30 wt %. When the concentration is within this range, a polyamic acid obtained by polymerization has an appropriate molecular weight, and the polyamic acid solution has an appropriate viscosity.

The organic solvent used for polymerization of the polyamic acid is not particularly limited as long as it does not react with a diamine, a tetracarboxylic acid dianhydride and a dicarboxylic acid or a derivative thereof and can dissolve the polyamic acid. Examples of the organic solvent include urea-based solvents such as methylurea and N,N-dimethylethylurea; sulfoxide or sulfone-based solvents such as dimethyl sulfoxide, diphenylsulfone and tetramethylsulfone; amide-based solvents such as N,N-dimethyacetamide (DMAc), N,N-dimethylformamide (DMF), N,N'-diethylacetamide, N-methyl-2-pyrrolidone (NMP), γ-butyrolactone and hexamethylphosphoric triamide; alkyl halide-based solvents such as chloroform and dichloromethane; aromatic hydrocarbon-based solvents such as benzene and toluene; and ether-based solvents such as tetrahydrofuran, 1,3-dioxolane, 1,4-dioxane, dimethyl ether, diethyl ether and p-cresol methyl ether. These solvents are normally used alone, or if necessary, two or more thereof are used in combination as appropriate. From the viewpoint of the solubility and polymerization reactivity of the polyamic acid, DMAc, DMF, NMP, and the like are preferably used.

A polyamideimide can be obtained by cyclodehydration of the polyamic acid. Examples of the method for preparing a polyamideimide from a polyamic acid solution include a method in which a dehydrating agent, an imidization catalyst and the like are added to a polyamic acid solution to advance imidization in the solution. The polyamic acid solution may be heated to accelerate the progress of imidization. By mixing a poor solvent with a solution containing a polyamideimide generated by imidization of the polyamic acid, a polyamideimide is precipitated as a solid. By isolating the polyamideimide as a solid substance, impurities generated during synthesis of the polyamic acid, and the residual dehydration agent and the imidization catalyst and the like can be washed and removed with the poor solvent, so that it is possible to prevent coloring of the polyamideimide and an increase in yellowness. By isolating the polyamideimide as a solid, a solvent, e.g., low-boiling-point solvent that is suitable for forming a formed article such as film can be applied in preparation of a solution for producing a film.

The molecular weight (weight average molecular weight in terms of polyethylene oxide which is measured by gel filtration chromatography (GPC)) of the polyamideimide is preferably 10,000 to 1,000,000, more preferably 20,000 to 500,000, still more preferably 40,000 to 3,000,000. An excessively small molecular weight may result in insufficient strength of the film. An excessively large molecular weight may result in poor compatibility with an acryl-based resin.

<Acryl-Based Resin>

Examples of the acryl-based resin include poly(meth) acrylic acid esters such as polymethyl methacrylate, methyl methacrylate-(meth)acrylic acid copolymers, methyl methacrylate-(meth) acrylic acid ester copolymers, methyl methacrylate-acrylic acid ester-(meth)acrylic acid copolymers, and methyl (meth)acrylate-styrene copolymers The tacticity of the polymer is not particularly limited, and may be any of an isotactic type, a syndiotactic type and an atactic type.

From the viewpoint of transparency, compatibility with polyamideimide, and mechanical strength of a formed article such as film, it is preferable that the acryl-based resin has methyl methacrylate as a main structural unit. The amount of methyl methacrylate based on the amount of all monomer components in the acryl-based resin is preferably 60 wt % or more, and may be 70 wt % or more, 80 wt % or more, 85 wt % or more, 90 wt % or more, or 95 wt % or more. The acryl-based resin may be a homopolymer of methyl methacrylate.

An imide structural unit or a lactone ring structural unit may be introduced in the acryl-based resin. Such a modified polymer is preferably one obtained by introducing an imide structure or a lactone ring structure into an acrylic polymer whose methyl methacrylate content is in the above-described range. That is, in the acryl-based resin modified by introduction of an imide structure or a lactone ring structure, the total amount of methyl methacrylate and modified structures of methyl methacrylate is preferably 60 wt % or more, and may be 70 wt % or more, 80 wt % or more, 85 wt % or more, 90 wt % or more, or 95 wt % or more. The modified polymer may be one obtained by introducing an imide structure or a lactone ring structure into a homopolymer of methyl methacrylate.

Introduction of an imide structure into an acryl-based polymer such as methyl methacrylate tends to lead to improvement of the glass transition temperature of the acryl-based resin. When the acryl-based resin contains an imide structure, the acryl-based resin may have improved compatibility with the polyamideimide.

For example, the polyamideimide whose ratio of the structure of the general formula (Va) to the total of the structure of the general formula (IVa) and the structure of the general formula (Va) is 60 mol % or more may be poor in compatibility with polymethyl methacrylate, but can have high compatibility with polymethyl methacrylate having an imide structure introduced thereinto.

For example, as described in JP 2010-261025 A, an acryl-based resin having an imide structure can be obtained by thermally melting a polymethyl methacrylate resin and treating it with an imidizing agent. A commercially-available product such as "PLEXIMID TT70" or "PLEXIMID 8805" manufactured by EVONIK may also be used as the imide-modified polymethyl methacrylate.

When the acryl-based resin has a glutarimide structure, the glutarimide content may be 3 wt % or more, 10 wt % or more, 20 wt % or more, 30 wt % or more, or 50 wt % or more. Compatibility with the polyamideimide tends to increase as the glutarimide content increases, and therefore the acryl-based resin having a higher glutarimide content is more likely to exhibit compatibility even with the polyamideimide having a high proportion of the structure of the general formula (Va) (a high proportion of the amide structure).

The glutarimide content is calculated by determining the ratio of introduction of the glutarimide structure (imidization ratio) from a 1H-NMR spectrum of the acryl-based resin and converting the imidization ratio to a weight basis. For example, in methyl methacrylate into which a glutarimide structure has been introduced, the imidization ratio Im=B/(A+B) is determined, where A is an area of a peak originating from O—$CH_3$ protons of methyl methacrylate (around 3.5 to 3.8 ppm) and B is an area of a peak originating from N—$CH_3$ protons of glutarimide (around 3.0 to 3.3 ppm).

From the viewpoint of the heat resistance of the resin composition and the formed article, the glass transition temperature of the acryl-based resin is preferably 90° C. or higher, more preferably 100° C. or higher, still more preferably 110° C. or higher, and may be 115° C. or higher, or 120° C. or higher.

From the viewpoint of solubility in an organic solvent, compatibility with the polyamideimide and strength of the formed article, the weight average molecular weight of the acryl-based resin (in terms of polystyrene) is preferably 5,000 to 5,000,000, more preferably 10,000 to 2,000,000, still more preferably 15,000 to 1,000,000, and may be 20,000 to 500,000, 30,000 to 300,000, or 50,000 to 200,000.

From the viewpoint of the heat stability and light stability of the resin composition and the film, it is preferable that the content of reactive functional groups such as ethylenically unsaturated groups and carboxy groups in the acryl-based resin is small. The iodine value of the acryl-based resin is preferably 10.16 g/100 g (0.4 mmol/g) or less, more preferably 7.62 g/100 g (0.3 mmol/g) or less, still more preferably 5.08 g/100 g (0.2 mmol/g) or less. The iodine value of the acryl-based resin may be 2.54 g/100 g (0.1 mmol/g) or less, or 1.27 g/100 g (0.05 mmol/g) or less. The acid value of the acryl-based resin is preferably 0.4 mmol/g or less, more preferably 0.3 mmol/g or less, still more preferably 0.2 mmol/g or less. The acid value of the acryl-based resin may be 0.1 mmol/g or less, 0.05 mmol/g or less, or 0.03 mmol/g or less. A small acid value tends to lead to enhancement of the stability of the acryl-based resin, and improvement of compatibility with the polyamideimide.

<Preparation of Resin Composition>

The polyamideimide and the acryl-based resin are blended to prepare a resin composition. The ratio between the polyamideimide and the acryl-based resin in the resin composition is not limited. The blending ratio (weight ratio) between the polyamideimide and the acryl-based resin may be 98:2 to 2:98, 95:5 to 10:90, or 90:10 to 15:85. When the proportion of the polyamideimide is higher, the mechanical strength of a formed article such as a film tends to be higher. When the proportion of the acryl-based resin is higher, a formed article such as a film is less colored and tends to have higher transparency.

In order to sufficiently exhibit the effect of improving transparency and processability by mixing the polyamideimide with the acryl-based resin, the proportion of the acryl-based resin in the total of the polyamideimide and the acryl-based resin is preferably 10 wt % or more, and may be 15 wt % or more, 20 wt % or more, 25 wt % or more, 30 wt % or more, 35 wt % or more, 40 wt % or more, 45 wt % or more, or 50 wt % or more.

It is preferable that a resin composition containing the polyamideimide and the acryl-based resin has a single glass transition temperature in differential scanning calorimetry (DSC) and/or dynamic mechanical analysis (DMA). When the resin composition has a single glass transition temperature, it can be considered that the polyamideimide and the acryl-based resin are completely compatible with each other. It is preferable that a formed article containing the polyamideimide and the acryl-based resin has a single glass transition temperature.

The resin composition may be one obtained by simply mixing a polyamideimide and an acryl-based resin precipitated as a solid content, or may be one obtained by kneading a polyamideimide and an acryl-based resin. When the polyamideimide solution is mixed with a poor solvent to precipitate the polyamideimide resin, an acryl-based resin may be mixed with the solution to precipitate a resin composition in which the polyamideimide and the acryl-based resin are mixed as a solid (powder).

The resin composition may be a mixed solution containing a polyamideimide and an acryl-based resin. The method for blending the resins is not particularly limited, and the resins may be mixed in a solid state, or may be mixed in a liquid to form a mixed solution. The polyamideimide solution and the acryl-based resin solution may be individually prepared, and mixed to prepare a mixed solution of the polyamideimide and the acryl-based resin.

The solvent of a solution containing the polyamideimide resin and the acryl-based resin is not particularly limited as long as it exhibits an ability to dissolve both the polyamideimide resin and the ester-based resin. Examples of the solvent include amide-based solvents such as N,N-dimethylformamide, N,N-dimethylacetamide and N-methyl-2-pyrrolidone; ether-based solvents such as tetrahydrofuran and 1,4-dioxane; ketone-based solvents such as acetone, methyl ethyl ketone, methyl propyl ketone, methyl isopropyl ketone, methyl isobutyl ketone, diethyl ketone, cyclopentanone, cyclohexanone and methyl cyclohexanone; and halogenated alkyl solvents such as chloroform, 1,2-dichloroethane, 1,1,2,2-tetrachloroethane, chlorobenzene, dichlorobenzene and dichloromethane.

An organic or inorganic low-molecular-weight compound, a high-molecular-weight compound (for example, epoxy resin) or the like may be blended in the resin composition. The resin composition may contain a flame retardant, an ultraviolet absorber, a crosslinking agent, a dye, a pigment, a surfactant, a leveling agent, a plasticizer, fine particles, a sensitizer and the like. The fine particles include organic fine particles such as those of polystyrene and polytetrafluoroethylene, and inorganic fine particles such as those of colloidal silica, carbon and layered silicate, and may have a porous or hollow structure. Fiber reinforcement materials include carbon fibers, glass fibers, and aramid fibers.

<Compatibility Between Polyamideimide and Acryl-Based Resin>

A polyimide or a polyamideimide is a polymer having a special molecular structure, and generally has low solubility in organic solvents and low compatibility with other polymers. A polyamideimide tends to have higher solubility in organic solvents as compared to a polyimide having a similar composition, but is less likely to exhibit compatibility with other resins as compared to the polyimide. The polyamideimide used in one or more embodiments of the present invention contains a fluoroalkyl-substituted benzidine as a diamine component, and thus exhibit high solubility in organic solvents and compatibility with the acryl-based resin. In addition, the polyamideimide having a high proportion of the amide structure can exhibit high compatibility with the acryl-based resin having an imide structure, even when the polyamideimide exhibits low compatibility with a general-purpose acryl-based resin such as methyl methacrylate.

As an index for predicting whether or not the polyamideimide and the acryl-based resin are compatible with each other, solubility parameter (SP value) can be used. The SP value of a polymer is calculated by Fedors method (atomic group contribution method). Fedors method is a method in which solubility parameter δ is calculated as $\delta=[\Sigma E_{coh}/\Sigma V]^{1/2}$ on the assumption that cohesive energy density $E_{coh}$ and molecular volume V both depend on the type of atomic group and the number of atomic groups, and therefore the SP value of a polymer can relatively easily be estimated when the molecular structure of the polymer is known.

The SP value of polymethyl methacrylate calculated by Fedors method is 20.15 $(J/cm^3)^{1/2}$. When an imide structure is introduced, the SP value tends to increase. For example, glutarimide-modified polymethyl methacrylate having a glutarimide content of 30 wt % has an SP value of 20.9 $(J/cm^3)^{1/2}$.

The polyamideimide tends to have a larger SP value as the proportion of the amide structure increases, and in this case, compatibility with polymethyl methacrylate is considered to reduce due to a large difference in SP value from polymethyl methacrylate. As described above, the SP value of the acryl-based resin is increased by introducing an imide structure into polymethyl methacrylate, and therefore, even when the polyamideimide has a high proportion of the amide structure, compatibility is considered to improve due to a small difference in SP value.

From the viewpoint of compatibility with the acryl-based resin, the SP value of the polyamideimide is preferably 24.0 $(J/cm^3)^{1/2}$ or less, more preferably 23.8 $(J/cm^3)^{1/2}$ or less, and may be 23.7 $(J/cm^3)^{1/2}$ or less, 23.6 $(J/cm^3)^{1/2}$ or less, or 23.6 $(J/cm^3)^{1/2}$ or less. The SP value of the polyamideimide may be 22.0 $(J/cm^3)^{1/2}$ or more, 22.5 $(J/cm^3)^{1/2}$ or more, 22.8 $(J/cm^3)^{1/2}$ or more, 23.0 $(J/cm^3)^{1/2}$ or more, or 23.2 $(J/cm^3)^{1/2}$ or more.

When the SP value of the polyamideimide is 23.2 $(J/cm^3)^{1/2}$ or more, the polyamideimide does not exhibit compatibility with polymethyl methacrylate in many cases, but can exhibit compatibility with polymethyl methacrylate having an imide structure. In a case where the composition contains an acryl-based resin and a polyamideimide having a high proportion of amide structure and high SP value, an imide content of the acryl-based resin is preferably 10 wt % or more, more preferably 20 wt % or more, and may be 30 wt % or more, 40 wt % or more, or 50 wt % or more.

[Formed Article and Film]

The above-described composition can be used for forming various formed articles. Examples of a shaping method include melting methods such as injection molding, transfer molding, press molding, blow molding, inflation molding, calender molding, and melt extrusion molding. The resin composition containing a polyamideimide and an acryl-based resin tends to have a melt viscosity lower than that of the polyamideimide itself, and is excellent in moldability in injection molding, transfer molding, press molding, melt extrusion molding, and the like.

A solution of the resin composition containing a polyamideimide and an acryl-based resin tends to have a solution viscosity lower than that of a solution of only the polyamideimide when both the solutions have the same solid content concentration. Therefore, the solution is excellent in handling properties such as transportability, and has a high coating property, which is advantageous in, for example, preventing film thickness unevenness.

In one embodiment, the formed article is a film. The method for forming the film may be either a melting method or a solution method, and a solution method is preferable from the viewpoint of producing a film excellent in transparency and uniformity. In the solution method, a solution containing the polyamideimide and the acryl-based resin is applied onto a support, and the solvent is removed by drying to obtain a film.

As a method for applying the resin solution onto the support, a known method using a bar coater, a comma coater or the like can be applied. As the support, a glass substrate, a metal substrate, a metal drum or a metal belt made of SUS or the like, a plastic film, or the like can be used. From the viewpoint of improving productivity, it is preferable to produce a film by a roll-to-roll process using an endless support such as a metal drum or a metal belt, a long plastic film or the like as a support. When a plastic film is used as the support, a material that is not soluble in a deposition dope solvent may be appropriately selected.

It is preferable to perform heating the solvent during drying. The heating temperature is not particularly limited as long as the solvent can be removed and coloring of the resulting film can be suppressed, and the temperature is appropriately set to room temperature to about 250° C., and is preferably 50° C. to 220° C. The heating temperature may be elevated stepwise. After drying proceeds to some extent, the resin film may be peeled off from the support and dried for enhancing the solvent removal efficiency. For accelerating the removal of the solvent, heating may be performed under reduced pressure.

Although an acrylic film may have low toughness, the strength of a film may be improved by using a system in which the polyamideimide and the acryl-based resin are compatible with each other. The film containing the polyamideimide and the acryl-based resin may be stretched in one direction or two or more directions.

A film immediately after film formation (in the case of the solution method, after drying a solvent) is an unstretched film, and generally has no refractive index anisotropy. By stretching the film in at least one direction, polymer chains are oriented along the stretching direction, such that the refractive index anisotropy of the film tends to increase and the mechanical strength of the film tends to be improved.

The film containing a polyamideimide and an acryl-based resin tends to have a large refractive index in the stretching direction. In a compatible system of the polyamideimide resin and the acryl-based resin, the tensile modulus in the stretching direction of the film increases, and the increase in the tensile modulus is remarkable when the stretching ratio is increased. By stretching the film, bending resistance in the stretching direction (bending resistance when a direction orthogonal to the stretching direction is a bending axis) tends to be improved.

For example, a film used as a cover film or a substrate material of a foldable display device (foldable display) is repeatedly bent along a bending axis at the same position, and is therefore required to have high mechanical strength in a direction perpendicular to the bending axis. When the film is disposed so that the stretching direction of the film is perpendicular to the bending axis, breakage and cracking of the film are hard to occur even when the film is repeatedly bent at the same position, which makes it possible to provide a device having excellent bending resistance.

In the direction orthogonal to the stretching direction, the tensile modulus tends to be smaller than that before stretching (unstretched film). However, the decrease in the tensile modulus in the orthogonal direction is slight as compared with the increase in the tensile modulus in the stretching direction. In addition, in the compatible system of the polyamideimide and the acryl-based resin, not only the bending resistance in the stretching direction is improved, but also the bending resistance in the direction orthogonal to the stretching direction tends to be improved by stretching the film.

The stretching conditions of the film are not particularly limited, and a method of stretching the film in the conveying direction between a pair of nip rolls having different peripheral speeds (free-end uniaxial stretching), a method of fixing both ends of the film in the width direction with pins or clips and stretching the film in the width direction (fixed-end uniaxial stretching), or the like can be employed.

The heating temperature during stretching is not particularly limited, and may be set, for example, within a range of about ±40° C. of the glass transition temperature of the film. As the stretching temperature is lower, the refractive index anisotropy of the film tends to increase. In addition, as the stretching ratio increases, the refractive index anisotropy of the film tends to increase.

The stretching temperature is preferably lower than 250° C., more preferably 245° C. or lower, and may be 240° C. or lower, 230° C. or lower, 225° C. or lower, 220° C. or lower, 215° C. or lower, 210° C. or lower, 205° C. or lower, 200° C. or lower, 195° C. or lower, or 190° C. or lower from the viewpoint of suppressing coloring of the film due to heating during stretching and obtaining a film having high transparency (low yellowness). The compatible resin composition of the polyamideimide and the acryl-based resin has a glass transition temperature lower than that of the polyamideimide resin, and thus has good stretching processability even at a temperature lower than 250° C.

The stretching temperature is preferably 100° C. or higher, more preferably 110° C. or higher, and may be 120° C. or higher, 130° C. or higher, 140° C. or higher, 150° C. or higher, 160° C. or higher, 170° C. or higher, or 180° C. or higher from the viewpoint of suppressing the increase in the haze of the film due to stretching.

The stretching ratio is, for example, 1 to 300%, and may be 5% or more, 10% or more, 30% or more, 50% or more, 70% or more, 90% or more, or 120% or more, or may be 250% or less, 200% or less, or 150% or less. The stretching ratio (%) is represented by $100\times(L_1-L_0)/L_0$, where $L_0$ is the length (original length) of the film before stretching in the stretching direction, and $L_1$ is the length of the film after stretching in the stretching direction.

A difference $(n_1-n_2)$ between a refractive index $n_1$ in the first direction in which the in-plane refractive index of the film is maximum and a refractive index $n_2$ in the second direction orthogonal to the first direction may be 1% or more of $n_2$. That is, in-plane refractive indices $n_1$ and $n_2$ of the film may satisfy: $100\times(n_1-n_2)/n_2\geq1.0$. The direction (first direction) in which the in-plane refractive index is maximum is determined using a retardation meter. The slow axis direction determined by retardation measurement is the first direction. The refractive index $n_1$ in the first direction and the refractive index $n_2$ in the second direction are values measured by a prism coupler method.

As the stretching ratio is larger and the orientation of molecules in the stretching direction is larger, the index of the refractive index anisotropy R (%): $100\times(n_1-n_2)/n_2$ tends to be larger and the tensile modulus in the stretching direction tends to be larger. As described above, R may be 1.0% or more, and may be 1.2% or more, 1.5% or more, 2.0% or more, or 3.0% or more.

As described above, the film containing the polyamideimide and the acryl-based resin tends to have a large refractive index in its stretching direction. Therefore, in the case of a uniaxially-stretched film, the stretching direction and the first direction are generally almost parallel, and an angle between the stretching direction and the first direction may be 10° or less, 5° or less, 3° or less, or 1° or less.

The thickness of the film is not limited, and may appropriately be set according to the intended use of the film. The thickness of the film is, for example, 5 to 300 μm. From the viewpoint of achieving both self-supporting properties and flexibility and the viewpoint of obtaining a film having high transparency, the thickness of the film is preferably 20 μm to 200 μm, and may be 30 μm to 150 μm, 40 μm to 100 μm, or 50 μm to 80 μm. The thickness of the film to be used as a cover film for displays is preferably 10 μm or more. When the film is stretched, the thickness after stretching is preferably with in the above range.

The total light transmittance (TT) of the film is preferably 85% or more, more preferably 87% or more, still more preferably 89% or more, particularly preferably 90% or more, and may be 91% or more. The haze of the film is preferably 10% or less, more preferably 5% or less, still more preferably 4% or less, and may be 3.5% or less, 3% or less, 2% or less, or 1% or less. The haze of the film is preferably as low as possible. As described above, since the polyamideimide and the acryl-based resin are compatible with each other, a film having low haze and high transparency is obtained. When a film having a thickness of 10 μm is produced from a resin composition obtained by blending the polyamideimide and the acryl-based resin, the total light transmittance and haze of the film are preferably within their respective above ranges.

The transmittance of the film at 400 nm is preferably 50% or more, more preferably 70% or more, still more preferably 80% or more, and may be 85% or more or 90% or more. The yellowness index (YI) of the film is preferably 2.5 or less, and may be 2.0 or less, 1.5 or less, or 1.0 or less. When a film having a thickness of 10 μm is produced from a resin composition obtained by blending the polyamideimide and the acryl-based resin, the yellowness index of the film is preferably within the above range. As described above, by blending the polyamideimide and the acryl-based resin, a film is obtained which is less colored and has a smaller YI as compared to a case where the polyamideimide is used alone.

From the viewpoint of strength, the tensile elastic modulus of the film is preferably 3.0 GPa or more, more preferably 3.3 GPa or more, still more preferably 3.4 GPa or more, and may be 3.5 GPa or more, 3.6 GPa or more, 3.7 GPa or more, 3.8 GPa or more, 3.9 GPa or more, or 4.0 GPa or more.

The pencil hardness of the film is preferably equal to or greater than F, and may be equal to or greater than H or equal to or greater than 2H. In the case of a system in which the polyamideimide and the acryl-based resin are compatible with each other, the pencil hardness is hard to reduce even when the proportion of the acryl-based resin is increased. Therefore, it is possible to provide a film that is less colored and excellent in transparency without significantly reducing excellent mechanical strength characteristic of the polyamideimide.

In a practical use, the film of one or more embodiments of the present invention may be provided with an antistatic layer, an easily bondable layer, a hard coat layer, an antireflection layer and the like on its surface.

The film formed from the resin composition containing a polyamideimide and an acryl-based resin is suitably used as a display material because the film is less colored and has high transparency. In particular, the film having high mechanical strength is applicable to surface members such as cover windows of displays. The film having excellent flex resistance (bending resistance) can suitably be used also as cover films disposed on the viewing-side surfaces of curved displays or bendable displays. For example, the cover film of a foldable image display device (foldable display) is repeatedly bent along a bending axis at the same position. The film having high bending resistance can suitably be used also for foldable devices because even when the film is repeatedly bent at the same position, breakage and cracking are hard to occur.

EXAMPLES

Hereinafter, embodiments of the present invention will be described in further detail by showing examples. The present invention is not limited to examples below.

[Polyamideimide Resin Production Examples]

N,N-dimethylacetamide (DMAc) was placed in a reaction vessel and stirred in a nitrogen atmosphere. A diamine, a tetracarboxylic dianhydride, and a dicarboxylic acid dichloride were added thereto at a ratio (mol %) shown in Table 1, and the mixture was reacted by stirring in a nitrogen atmosphere for 5 to 10 hours to obtain a polyamic acid solution having a solid content concentration of 10 wt %.

Pyridine was added to the polyamic acid solution as an imidization catalyst and completely dispersed, acetic anhydride was then added, and the mixture was stirred at 90° C. for 3 hours. After the solution was cooled to room temperature, a polyamideimide resin was precipitated by adding methanol dropwise while the solution was stirred. Methanol was further added, the mixture was stirred for about 30 minutes, and suction filtration was then performed using a Kiriyama funnel. The thus obtained solid was washed with methanol and then dried in a vacuum oven set at 120° C. for 12 hours to obtain a polyamideimide resin. It should be noted that as for Samples 101 to 104 in Table 1, polyimides were prepared using, as monomers, a diamine and a tetracarboxylic dianhydride without using a dicarboxylic acid dichloride.

The solubility parameter (SP) of each of the polyamideimide resins and the polyimide resins prepared above was calculated by Fedors method on the basis of the composition of the resin. The calculation was performed using BIOVIA Notebook and BIOVIA Pipeline Pilot Polymer Properties. Specifically, a protocol shown in FIG. 1 was prepared in BIOVIA Pipeline Pilot Polymer Properties and was recalled from BIOVIA Notebook to calculate solubility parameter on the basis of a structure after the completion of polymerization and imidization reaction.

[Acryl-Based Resin]

As the acryl-based resin 1, a commercially-available polymethyl methacrylate resin ("PARAPET HM1000" manufactured by Kuraray Co., Ltd., glass transition temperature: 120° C.) was prepared.

As the acryl-based resin 2, a glutarimide-modified acryl-based resin (glutarimide content: 29 wt %, glass transition temperature: 131° C.) was prepared in accordance with "Acryl-based resin production example" described in JP 2018-70710 A.

[Film Production Examples]

<Sample 1>

The polyamideimide with a composition of TFMB//6FDA//TPC=100//50//50 obtained in the above production example and the acryl-based resin 1 were dissolved in DMAc in a weight ratio of 50:50 to prepare a solution having a resin content of 10 wt %. This solution was applied onto an alkali-free glass plate and dried by heating at 60° C.

for 15 minutes, 90° C. for 15 minutes, 120° C. for 15 minutes, 150° C. for 15 minutes, 180° C. for 15 minutes, and 200° C. for 15 minutes in an air atmosphere to produce a film having a thickness of about 50 μm.

<Samples 2 to 19>

In the same manner as in production of Sample 1 except that the composition of the polyamideimide resin, the type of acryl-based resin, and the type of solvent were changed as shown in Table 1, a film having a thickness of about 50 μm was produced by applying the solution onto an alkali-free glass plate and drying the solution by heating. It should be noted that in Table 1, DMF denotes N,N-dimethyl formamide and DCM denotes methylene chloride.

<Samples 101 to 104: Mixed Films of Polyimide and Acryl-Based Resin>

The polyimide resin with a composition shown in Table 1 was used instead of the polyamideimide, and the type of solvent used was changed as shown in Table 1. A film having a thickness of about 50 μm was produced in the same manner as in production of Sample 1 except for the above.

<Sample 201: Polyamideimide Film>

A DMAc solution of the polyamideimide resin with a composition of TFMB//6FDA//TPC=100//50//50 was prepared without using the acryl-based resin, and a film having a thickness of about 50 μm was produced under the same conditions as in production of Sample 1.

<Sample 202: Polyamideimide Film>

A DMF solution of the polyamideimide resin with a composition of TFMB//6FDA//BPDA//TPC=100//40//30//30 was prepared without using the acryl-based resin, and a film having a thickness of about 50 μm was produced under the same conditions as in production of Sample 8.

<Sample 301: Acrylic Film>

A film having a thickness of about 50 μm was produced under the same conditions as in production of Sample 1 except that a DMC solution of the acryl-based resin 1 was prepared, and the heating conditions during drying were changed to 60° C. for 30 minutes, 80° C. for 30 minutes, 100° C. for 30 minutes and 110° C. for 30 minutes.

<Sample 302: Acrylic Film>

A DMC solution of the acryl-based resin 2 was prepared, and a film having a thickness of about 50 μm was produced under the same conditions as in production of Sample 301.

[Evaluations]

<Haze and Total Light Transmittance>

The film was cut into a 3 cm square to measure haze and total light transmittance in accordance with JIS K7136 and JIS K7361-1 using a haze meter "HZ-V3" manufactured by Suga Test Instruments Co., Ltd. As for the films having a haze of more than 20% (Samples 4, 6, 11, and 14), total light transmittance (TT) and yellowness index (YI) and pencil hardness, which will be described below, were not measured (indicated as ND in Table 1). The film of Sample 14 was hard to handle, and therefore tensile elastic modulus was not measured, either.

<Yellowness Index>

The film was cut to a 3 cm square, and the yellowness index (YI) was measured in accordance with JIS K 7373 using a spectrophotometer "SC-P" manufactured by Suga Test Instruments Co., Ltd.

<Tensile Modulus>

The film was cut into a strip shape having a width of 10 mm, and allowed to stand at 23° C./55% RH for 1 day to adjust the humidity thereof. Then, a tensile modulus was measured under the following conditions using "AUTOGRAPH AGS-X" manufactured by Shimadzu Corporation.

Distance between chucks: 100 mm

Tensile speed: 20.0 mm/min

Measurement temperature: 23° C.

<Pencil Hardness>

The pencil hardness of the film was measured according to JIS K5600-5-4 "Pencil Scratch Test".

<Flex Resistance>

The film was cut into a strip shape of 20 mm×100 mm and bent 180° at the center in the length direction. When the film was not broken, flex resistance was rated as "good" and when the film was broken, flex resistance was rated as "poor".

[Evaluation Results]

Table 1 shows the compositions of the resins (the compositions of the polyamideimides and the type of acryl-based resin), the type of solvent, and the evaluation results of the films.

In Table 1, compounds are abbreviated as follows.

<Diamines>

TFMB: 2,2'-Bis(trifluoromethyl)benzidine

DDS: 3,3'-Diaminodiphenylsulfone

<Tetracarboxylic Dianhydrides>

6FDA: 4,4'-(Hexafluoroisopropylidene)diphthalic anhydride

BPADA: 4,4'-(4,4'-Isopropylidenediphenoxy)diphthalic anhydride

TAHMBP: Bis(1,3-dioxo-1,3-dihydroisobenzofuran-5-carboxylic acid)-2,2',3,3',5,5'-hexamethylbiphenyl-4,4'-diyl CBDA: 1,2,3,4-Cyclobutanetetracarboxylic dianhydride BPDA: 3,3',4,4'-Biphenyltetracarboxylic dianhydride PMDA: Pyromellitic dianhydride BTDA: 3,3',4,4'-Benzophenonetetracarboxylic dianhydride <Dicarboxylic Acid Dichlorides>

TPC: Terephthalic acid dichloride

IPC: Isophthalic acid dichloride

H-TPC: 1,4-Cyclohexanedicarboxylic acid dichloride

BPC: 4,4'-Biphenyldicarbonyl chloride

OBC: 4,4'-oxybis(benzoylchloride)

TABLE 1

| Sample | Resin composition | | | | | | | | | | | | | |
|---|---|---|---|---|---|---|---|---|---|---|---|---|---|---|
| | Polyamideimide | | | | | | | | | | | | | |
| | Diamine | | Tetracarboxylic dianhydride | | | | | | | Dicarboxylic acid dichloride | | | | |
| No. | TFMB | DDS | 6FDA | BPADA | TAHMBP | CBDA | BPDA | PMDA | BTDA | TPC | IPC | H-TPC | BPC | OBC |
| 1 | 100 | — | 50 | — | — | — | — | — | — | 50 | — | — | — | — |
| 201 | 100 | — | 50 | — | — | — | — | — | — | 50 | — | — | — | — |
| 301 | | | | | | | — | | | | | | | |
| 2 | 100 | — | 70 | — | — | — | — | — | — | 30 | — | — | — | — |
| 3 | 100 | — | 70 | — | — | — | — | — | — | — | — | 30 | — | — |

TABLE 1-continued

| | | | | | | | | | | | | | | |
|---|---|---|---|---|---|---|---|---|---|---|---|---|---|---|
| 4 | 100 | — | 70 | — | — | — | — | — | — | — | — | — | 30 | — |
| 101 | 100 | — | 100 | — | — | — | — | — | — | | | — | | |
| 5 | 100 | — | 70 | — | — | — | — | 20 | — | 10 | — | — | — | — |
| 6 | — | 100 | 70 | — | — | — | — | — | — | 30 | — | — | — | — |
| 7 | 100 | — | 60 | — | — | — | 30 | — | — | 10 | — | — | — | — |
| 102 | 100 | — | 60 | — | — | — | 40 | — | — | | | — | | |
| 8 | 100 | — | 40 | — | — | — | 30 | — | — | 30 | — | — | — | — |
| 202 | 100 | — | 40 | — | — | — | 30 | — | — | 30 | — | — | — | — |
| 9 | 100 | — | 50 | — | — | — | — | — | 20 | 30 | — | — | — | — |
| 10 | 100 | — | 50 | — | — | — | 30 | — | — | — | 20 | — | — | — |
| 11 | 100 | — | 29 | — | — | — | — | — | — | 28 | — | — | — | 43 |
| 12 | 100 | — | 29 | — | — | — | — | — | — | 28 | — | — | — | 43 |
| 302 | | | | | | | — | | | | | | | |
| 13 | 100 | — | 30 | — | — | — | — | — | — | 20 | — | — | 50 | — |
| 14 | 100 | — | 15 | — | — | 15 | — | — | — | 70 | — | — | — | — |
| 15 | 100 | — | 15 | — | — | 15 | — | — | — | 70 | — | — | — | — |
| 16 | 100 | — | — | 70 | — | — | — | — | — | 30 | — | — | — | — |
| 103 | 100 | — | — | 70 | — | 30 | — | — | — | | | — | | |
| 104 | 100 | — | — | 100 | — | — | — | — | — | | | — | | |
| 17 | 100 | — | — | 60 | — | 30 | — | — | — | 10 | — | — | — | — |
| 18 | 100 | — | — | — | 50 | 20 | — | — | — | 30 | — | — | — | — |
| 19 | 100 | — | — | — | 50 | — | — | 20 | — | 30 | — | — | — | — |

| | Resin composition | | | Film Characteristics | | | | | | |
|---|---|---|---|---|---|---|---|---|---|---|
| Sample No. | Polyamideimide SP | Acryl-based resin | Solvent | Thickness (μm) | Haze (%) | TT (%) | YI | Tensile elastic modulus (GPa) | Pencil hardness | Flex resistance |
| 1 | 23.14 | 1 | DMAc | 51 | 0.8 | 91.4 | 1.5 | 3.6 | H | Good |
| 201 | 23.14 | — | DMAc | 44 | 0.4 | 89.5 | 2.7 | 4.3 | 3H | Good |
| 301 | — | 1 | DCM | 60 | 0.3 | 92.5 | 0.2 | 2.6 | HB | Poor |
| 2 | 22.89 | 1 | DMF | 49 | 0.2 | 91.5 | 0.6 | 3.4 | H | Good |
| 3 | 22.89 | 1 | DMF | 55 | 0.5 | 91.6 | 0.7 | 3.3 | H | Good |
| 4 | 22.81 | 1 | DMF | 55 | 92 | ND | ND | 3.1 | ND | Good |
| 101 | 22.57 | 1 | DMF | 52 | 0.3 | 91.7 | 0.7 | 3.3 | H | Good |
| 5 | 22.83 | 1 | DCM | 53 | 0.2 | 91.5 | 1.2 | 3.6 | H | Good |
| 6 | 24.81 | 1 | DMF | 50 | 90 | ND | ND | 3.5 | ND | Good |
| 7 | 22.88 | 1 | DCM | 54 | 0.2 | 91.1 | 0.8 | 4.0 | H | Good |
| 102 | 22.84 | 1 | DMF | 56 | 0.3 | 91.3 | 1.0 | 3.5 | 3H | Good |
| 8 | 23.13 | 1 | DMF | 51 | 0.3 | 90.4 | 1.2 | 4.0 | H | Good |
| 202 | 23.13 | — | DMF | 30 | 0.3 | 89.3 | 1.9 | 4.5 | 2H | Good |
| 9 | 23.18 | 1 | DMF | 50 | 0.3 | 91.3 | 1.4 | 3.4 | 2H | Good |
| 10 | 23.00 | 1 | DMF | 49 | 0.3 | 91.4 | 0.9 | 3.6 | 3H | Good |
| 11 | 23.28 | 1 | DMF | 51 | 89 | ND | ND | 3.1 | ND | Good |
| 12 | 23.28 | 2 | DMF | 50 | 0.2 | 91.0 | 0.8 | 3.4 | 2H | Good |
| 302 | — | 2 | DCM | 52 | 0.3 | 92.1 | 0.2 | 2.9 | HB | Poor |
| 13 | 23.23 | 2 | DMF | 52 | 0.4 | 91.2 | 1.3 | 3.4 | H | Good |
| 14 | 23.65 | 1 | DMF | 52 | 91 | ND | ND | ND | ND | Poor |
| 15 | 23.65 | 2 | DMF | 48 | 0.6 | 90.9 | 1.1 | 4.4 | 3H | Good |
| 16 | 22.57 | 1 | DMF | 52 | 0.9 | 91.0 | 1.1 | 3.0 | H | Good |
| 103 | 22.52 | 1 | DMF | 51 | 0.2 | 91.2 | 0.7 | 3.1 | F | Good |
| 104 | 22.24 | 1 | DMF | 59 | 0.2 | 91.0 | 0.9 | 3.0 | F | Good |
| 17 | 22.65 | 1 | DCM | 50 | 0.2 | 91.2 | 0.7 | 3.4 | 3H | Good |
| 18 | 22.63 | 1 | DMF | 51 | 0.5 | 91.2 | 0.9 | 4.5 | 3H | Good |
| 19 | 22.61 | 1 | DMF | 52 | 0.3 | 90.9 | 1.8 | 4.5 | 3H | Good |

The polyamideimide film produced as Sample 201 using only the polyamideimide resin had a high tensile elastic modulus and excellent mechanical characteristics, but the YI exceeded 2.5 and the total light transmittance was less than 90%, and therefore transparency was poor. The acrylic film produced as Sample 301 using only the acryl-based resin 1 had a low tensile elastic modulus and a pencil hardness of HB and was poor in mechanical strength. In addition, the acrylic film of Sample 301 was poor also in flex resistance.

The film produced as Sample 1 using the resin composition obtained by blending the same polyamideimide resin as Sample 201 and the acryl-based resin 1 exhibited higher total light transmittance and smaller YI as compared to the polyamideimide film of Sample 201, and was therefore less colored and excellent in transparency. In addition, the film of Sample 1 had higher mechanical strength as compared to the acrylic film of Sample 301, and therefore had both transparency and mechanical strength. Comparison among the film of Sample 8, the polyamideimide film of Sample 202, and the acrylic film of Sample 301 also showed the same tendency.

Similarly to Sample 1, the films of Sample 2, Sample 5, Sample 8, and Sample 9 containing a higher proportion of tetracarboxylic dianhydride components and a lower proportion of dicarboxylic acid components in the polyamideimide than Sample 1 also achieved both excellent transparency and mechanical strength. The same was true for Samples 3 and 4 and Sample 10 in which the type of dicarboxylic acid used was changed.

Similarly to Sample 1 and the like, the films of Samples 16 to 19 using the polyamideimides not containing a fluorine-containing tetracarboxylic dianhydride (6FDA) as a tetracarboxylic dianhydride component also achieved both excellent transparency and mechanical strength. Among them, the films of Sample 18 and Sample 19 using the polyamideimides containing, as a tetracarboxylic dianhydride component, TAHMBP, which is a bis(trimellitic anhydride)ester, had a high tensile elastic modulus, a high pencil hardness, extremely excellent mechanical strength, and excellent transparency.

The film of Sample 4 using 4,4'-biphenyldicarboxylic acid as a dicarboxylic acid component had a significantly increased haze. The same was true for the film of Sample 6 using the polyamideimide containing only 3,3'-DDS as a diamine component. In the case of these examples, it was considered that compatibility between the polyamideimide and the acryl-based resin (PMMA) was low so that the haze was increased.

Similarly to the film of Sample 4, the film produced as Sample 11 using the composition containing the polyamideimide having a proportion of dicarboxylic acid components of more than 70% and the acryl-based resin 1 (PMMA) also had a significantly increased haze. In contrast, the film produced as Sample 12 using the composition containing the same polyamideimide and the acryl-based resin 2 having a glutarimide structure had a haze of 0.2% and showed high transparency. Comparison between Sample 14 and Sample 15 showed the same tendency. Similarly to Sample 12 and Sample 15, the film of Sample 13 had a low haze and excellent transparency.

As can be seen from these results, the acryl-based resin having an imide structure has excellent compatibility also with the polyamideimides having a high proportion of the amide structure, which makes it possible to produce a low-haze film.

As can be seen from comparison between Sample 101 and Samples 1 to 6 and 11 to 15, comparison between Sample 102 and Samples 7 to 9, and comparison between Samples 103 and 104 and Samples 16 to 19, the polyamideimides have higher SP values than the polyimides, and the SP value tends to increase as the proportion of the amide structure increases. The polyamideimide having a high proportion of the amide structure has high SP value and is hard to be compatible with PMMA. However, the acryl-based resin having an imide structure is considered to have excellent compatibility also with the polyamideimide having a high proportion of the amide structure because SP value of the acryl-based resin is increased by introducing an imide structure so that a difference in SP value from the polyamideimide is reduced.

[Production and Evaluation of Stretched Films]

<Samples 51 to 53>

Films containing the polyamideimide resin and the acryl-based resin in a weight ratio of 50:50 were produced in the same manner as in production of Samples 8, 10, and 17, and were subjected to free-end uniaxial stretching at a temperature and a draw ratio shown in Table 2 to obtain stretched films.

As for the obtained stretched films, haze, total light transmittance (TT), yellowness index (YI), and pencil hardness were evaluated in the same manner as described above. The pencil hardness was evaluated in such a manner that a scratching direction (the direction of pencil movement) was parallel to the stretching direction. Refractive index, tensile elastic modulus, and dynamic bending resistance were evaluated in the following manner.

<Determination of First Direction>

A retardation was measured at a wavelength of 589 nm by a parallel Nicole rotation method using a retardation measuring device "KOBRA" manufactured by Oji Scientific Instruments. The direction of an orientation axis (slow axis direction), that is, a direction in which an in-plane refractive index was maximum was defined as a first direction. A direction orthogonal to the first direction in a film plane (fast axis direction) was defined as a second direction. In all Samples 51 to 53, the stretching direction and the first direction were almost parallel, and an angle between the stretching direction and the first direction was within 1°.

<Refractive Index>

The film was cut into a 3 cm square to measure a refractive index $n_1$ in the first direction and a refractive index $n_2$ in the second direction with a prism coupler ("2010/M" manufactured by Metricon Corporation). The index R (%): $100\times(n_1-n_2)/n_2$ of in-plane refractive index anisotropy was calculated from $n_1$ and $n_2$.

<Tensile Elastic Modulus>

The film was cut into a strip shape having a width of 10 mm so that the long sides were parallel to the first direction, and was allowed to stand at 23° C./55% RH for 1 day for moisture conditioning. Then, a tensile test was performed in such a manner that the first direction was parallel to a tensile direction to measure a tensile elastic modulus in the first direction. In addition, the film was cut into a strip shape so that the long sides were parallel to the second direction, and was allowed to stand at 23° C./55% RH for 1 day to for moisture conditioning. Then, a tensile test was performed in such a manner that the second direction was parallel to a tensile direction to measure also a tensile elastic modulus in the second direction.

<Dynamic Bending Test>

The film was cut into a strip shape of 20 mm×150 mm so that the long sides were parallel to the first direction. The short sides of this sample were attached to a U-shape folding test jig ("DMX-FS" manufactured by Yuasa System Co., Ltd.). Then, in an environment of a temperature of 23° C. and a relative humidity of 55%, a repetition bending test was performed under the conditions of a bending radius of 1.0 mm, a bending angle of 180°, and a bending speed of one time/second in such a manner that a bending axis was parallel to the second axis of the film by a desktop endurance test machine ("DMLHB" manufactured by Yuasa System Co., Ltd.) to determine the endurable number of cycles. Specifically, the presence or absence of cracking or breakage of the film was checked every 1,000 times of bending cycles (every 100,000 times of cycles after 100,000 times of cycles), and the maximum number of bending cycles at which cracking or breakage did not occur was defined as the endurable number of cycles in the first direction. The film was cut into a strip shape of 20 mm×150 mm so that the long sides were parallel to the second direction, and the same test was performed using such a sample in such a manner that a bending axis was parallel to the first direction of the film to determine the endurable number of cycles in the second direction.

As for Samples 51 to 53 (stretched films) and Samples 8, 10, and 17 (unstretched films), the compositions of the resins (the compositions of the polyamideimides and the type of acryl-based resin used), film production conditions (the type of solvent used and stretching conditions), and the evaluation results of thickness, haze, total light transmittance (TT), yellowness index, elastic modulus, pencil hardness, endurable number of cycles on dynamic bending test, and refractive index of the films are shown in Table 2. It should be noted that as for Samples 8, 10, and 17, evaluation of the tensile elastic modulus and the endurable number of cycles on dynamic bending test was performed only in the first direction.

TABLE 2

| Sample No. | Resin composition: Composition of polyamideimide | Resin composition: Type of acryl-based resin | Resin composition: Solvent | Stretching: Temperature (° C.) | Stretching: Draw ratio (%) | Thickness (μm) | Haze (%) | TT (%) |
|---|---|---|---|---|---|---|---|---|
| 8 | TFMB//6FDA/BPDA//TPC = | 1 | DMF | — | | 51 | 0.3 | 90.4 |
| 51 | 100//40/30//30 | | | 190 | 70 | 46 | 0.7 | 90.8 |
| 10 | TFMB//6FDA/BPDA//IPC = | 1 | DMF | — | | 49 | 0.3 | 91.4 |
| 52 | 100//50/30//20 | | | 190 | 70 | 41 | 0.7 | 90.9 |
| 17 | TFMB//BPADA/CBDA//TPC = | 1 | DCM | — | | 50 | 0.2 | 91.2 |
| 53 | 100//60/30//10 | | | 180 | 70 | 51 | 0.2 | 90.9 |

| Sample No. | YI | Pencil hardness | Elastic modulus (GPa): First direction | Elastic modulus (GPa): Second direction | Dynamic bending (1000 times): First direction | Dynamic bending (1000 times): Second direction | Refractive index: $n_1$ | Refractive index: $n_2$ | Refractive index: R (%) |
|---|---|---|---|---|---|---|---|---|---|
| 8 | 1.2 | 2H | 4.0 | ND | 15 | ND | 1.5436 | 1.5433 | 0.02 |
| 51 | 1.8 | H | 5.6 | 3.0 | 200 | 100 | 1.5740 | 1.5263 | 3.13 |
| 10 | 0.9 | 3H | 3.6 | ND | 100 | ND | 1.5395 | 1.5394 | 0.01 |
| 52 | 1.6 | 3H | 4.1 | 3.3 | 300 | 100 | 1.5603 | 1.5286 | 2.07 |
| 17 | 0.7 | 3H | 3.4 | ND | 7 | ND | 1.5460 | 1.5456 | 0.03 |
| 53 | 0.8 | H | 4.6 | 2.9 | 200 | 100 | 1.5770 | 1.5349 | 2.75 |

Unstretched films of samples 8, 10, and 17 were small in difference between the refractive indexes in film plane. In contrast, stretched films of Samples 51 to 53 had R exceeding 2% and large anisotropy.

The unstretched film of Sample 8 had a tensile elastic modulus of 4.0 GPa and an endurable number of cycles on dynamic bending test of 15,000 times. In contrast, the stretched film of sample 51 having the same composition had a refractive index of 5.6 GPa in the first direction (stretching direction) and excellent mechanical strength. In addition, the film of Sample 51 had an endurable number of cycles of 200,000 times in the first direction and was therefore excellent in bending resistance. The film of Sample 51 was superior to Sample 8 also in bending resistance in the second direction.

Comparison between Sample 10 and Sample 52 and comparison between Sample 17 and Sample 53 also showed the same tendency. That is, the stretched films had higher elastic moduli in the first direction (stretching direction) than the unstretched films, and were superior to the unstretched films in bending resistance in both the first direction and the second direction.

As can be seen from the above results, when the films in which the polyamideimide and the acryl-based resin are compatible with each other are stretched, refractive index anisotropy is increased, and accordingly, the tensile elastic moduli in the first direction (stretching direction) and the bending resistance in the first direction and the second direction are significantly improved so that the films have excellent mechanical strength and transparency.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A resin composition comprising: a polyamideimide; and an acryl-based resin, wherein the polyamideimide has an imide structure which is formed via bonding between a diamine-derived structure represented by general formula (IIIa) and a tetracarboxylic-dianhydride-derived structure represented by general formula (IVa), and an amide structure which is formed via bonding between the diamine-derived structure represented by general formula (IIIa) and a dicarboxylic-acid-derived structure represented by general formula (Va), (IIIa)

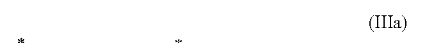

(IVa)

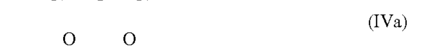

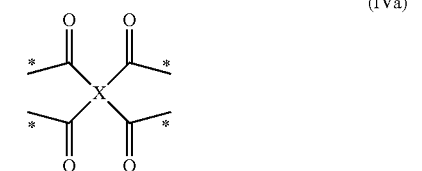

(Va)

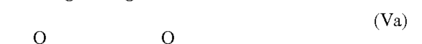

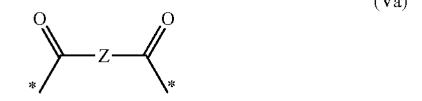

wherein Y is a divalent organic group and is a diamine residue, X is a tetravalent organic group and is a tetracarboxylic dianhydride residue, and Z is a divalent organic group and is a dicarboxylic acid residue, wherein the polyamideimide contains a structure derived from a fluoroalkyl-substituted benzidine as the diamine-derived structure.

2. The resin composition according to claim 1, wherein the fluoroalkyl-substituted benzidine is 2,2'-bis(trifluoromethyl)benzidine.

3. The resin composition according to claim 1, wherein a ratio of an amount of the structure derived from the fluoroalkyl-substituted benzidine relative to the total amount of the diamine-derived structure in the polyamideimide is 30 mol % or more.

4. The resin composition according to claim 1, wherein a ratio of a total amount of a structure derived from a fluorine-containing aromatic tetracarboxylic dianhydride, a structure derived from an alicyclic tetracarboxylic dianhydride, a structure derived from a bis(trimellitic anhydride) ester, a structure derived from 4,4'-(4,4'-isopropylidenediphenoxy)diphthalic anhydride and a structure derived from pyromellitic anhydride relative to the total amount of the tetracarboxylic-dianhydride-derived structure is 50 mol % or more.

5. The resin composition according to claim 1, wherein a ratio of the dicarboxylic-acid-derived structure relative to the total of the tetracarboxylic-dianhydride-derived structure represented by general formula (IVa) and the dicarboxylic-acid-derived structure represented by general formula (Va) of the polyamideimide is 5 to 80 mol %.

6. The resin composition according to claim 1, wherein the polyamideimide contains a structure derived from at least one selected from the group consisting of terephthalic acid, isophthalic acid, 4,4'-biphenyldicarboxylic acid, 4,4'-oxybisbenzoic acid, 1,4-cyclohexanedicarboxylic acid, and bi(cyclohexyl)-4,4'-dicarboxylic acid as the dicarboxylic-acid-derived structure.

7. The resin composition according to claim 1, wherein a total amount of methyl methacrylate and modified structures of methyl methacrylate is 60 wt % or more based on an amount of all monomer components in the acryl-based resin.

8. The resin composition according to claim 1, wherein the acryl-based resin has an imide structure.

9. The resin composition according to claim 1, wherein the acryl-based resin has a glutarimide structure, and a content of the glutarimide structure is 10 wt % or more, wherein the content of the glutarimide is calculated by determining the ratio of introduction of the glutarimide structure from a $^{1}$H-NMR spectrum of the acryl-based resin and converting the ratio of introduction of the glutarimide structure to a weight basis.

10. The resin composition according to claim 1, containing the polyamideimide and the acryl-based resin at a weight ratio of 98:2 to 2:98.

11. A formed article comprising the resin composition according to claim 1.

12. A film comprising the resin composition according to claim 1.

13. The film according to claim 12, wherein the film is a stretched film that is stretched in at least one direction.

14. The film according to claim 12, wherein the film has a thickness of 5 to 300 μm.

15. The film according to claim 12, wherein the film has a total light transmittance of 85% or more, a haze of 10% or less, and a yellowness index of 2.5 or less.

* * * * *